United States Patent
Asai

(10) Patent No.: US 10,152,288 B1
(45) Date of Patent: Dec. 11, 2018

(54) NON-TRANSITORY COMPUTER-READABLE MEDIUM AND PORTABLE TERMINAL

(71) Applicant: BROTHER KOGYO KABUSHIKI KAISHA, Nagoya-shi, Aichi-ken (JP)

(72) Inventor: Norihiko Asai, Tajimi (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/926,012

(22) Filed: Mar. 20, 2018

(30) Foreign Application Priority Data

May 26, 2017 (JP) ................. 2017-104565

(51) Int. Cl.
  *G06F 3/12* (2006.01)

(52) U.S. Cl.
  CPC .......... *G06F 3/1291* (2013.01); *G06F 3/1231* (2013.01); *G06F 3/1241* (2013.01); *G06F 3/1285* (2013.01); *G06F 3/1292* (2013.01)

(58) Field of Classification Search
  USPC ....................................................... 358/1.15
  See application file for complete search history.

(56) References Cited

U.S. PATENT DOCUMENTS

| 2001/0046067 | A1* | 11/2001 | Taniguchi | H04N 1/00204 358/1.15 |
| 2007/0208837 | A1* | 9/2007 | Tian | G06F 3/1204 709/223 |
| 2012/0221901 | A1* | 8/2012 | Tanaka | G06F 11/0709 714/57 |
| 2012/0243043 | A1 | 9/2012 | Asai | |
| 2013/0050741 | A1* | 2/2013 | Raja | G06F 3/1204 358/1.15 |
| 2015/0036176 | A1* | 2/2015 | Naruse | H04N 1/00925 358/1.15 |

FOREIGN PATENT DOCUMENTS

JP    2012-203742 A    10/2012

* cited by examiner

*Primary Examiner* — Allen H Nguyen
(74) *Attorney, Agent, or Firm* — Merchant & Gould P.C.

(57) ABSTRACT

A portable terminal has a memory having a program stored thereon and readably by a computer. The program causes the portable terminal to perform deciding an image forming apparatus enabling to execute a first operation as a first designated apparatus which executes the first operation in accordance with predetermined decision criteria, deciding an image forming apparatus designated by a user of the portable terminal as a second designated apparatus which executes a second operation different from the first operation, receiving a designation of designating at least one of the first operation and the second operation, transmitting first instruction information that instructs to execute the first operation to the first designated apparatus when the first operation is designated in the designation, and transmitting second instruction information that instructs to execute the second operation to the second designated apparatus when the second operation is designated in the designation.

23 Claims, 12 Drawing Sheets

NON-TRANSITORY COMPUTER-READABLE MEDIUM AND PORTABLE TERMINAL

CROSS-REFERENCE TO RELATED APPLICATION

This application claims priority from Japanese Patent Application No. 2017-104565 filed on May 26, 2017, the entire subject-matter of which is incorporated herein by reference.

TECHNICAL FIELD

The present disclosure relates to a non-transitory computer-readable medium having a program that enables an image forming apparatus to execute an image forming operation, and a portable terminal having a computer that enables to execute the program.

BACKGROUND

There has been disclosed a terminal program of a portable terminal for enabling an image processing apparatus, which can perform communication through a communication network, to execute an image forming operation. More specifically, the related-art terminal program is configured to receive a user operation of designating a desired image forming apparatus and an image forming operation, and to enable the designated image forming apparatus to execute the designated image forming operation.

Recently, in home, small offices and the like, an environment in which a plurality of image forming apparatuses is connected to a communication network increases. Also, most of the recent image forming apparatuses are so-called "complex machines" capable of executing a plurality of image forming operations. For this reason, as the number of the image forming apparatuses to be connected to the communication network increases or the number of the image forming operations, which can be executed by the image forming apparatus, increases, a user operation of designating an image forming apparatus for executing a desired image forming operation becomes troublesome.

SUMMARY

The specification discloses a non-transitory computer-readable medium having a program that enables to appropriately decide an image forming apparatus for executing each of image forming operations by a simple user operation, and the portable terminal having a computer that enables to execute the program.

One illustrative aspect provides a non-transitory computer-readable medium having a program stored thereon and readably by a computer of a portable terminal comprising a communication interface and a user interface, the program, when executed by the computer, causes the portable terminal to perform:

deciding an image forming apparatus, that enables to execute a first operation, to be a first designated apparatus for executing the first operation out of a plurality of image forming apparatuses capable of performing communication through the communication interface in accordance with predetermined decision criteria;

deciding an image forming apparatus, that is designated by a user of the portable terminal, to be a second designated apparatus for executing a second operation different from the first operation out of the plurality of image forming apparatuses capable of performing communication through the communication interface;

receiving an operation designation of designating at least one of the first operation and the second operation, through the user interface;

transmitting first instruction information that instructs to execute the first operation, to the first designated apparatus through the communication interface, when the first operation is designated in the operation designation; and transmitting second instruction information that instructs to execute the second operation, to the second designated apparatus through the communication interface, when the second operation is designated in the operation designation.

The aspect provides a portable terminal having:
a communication interface;
a user interface; and
a controller,
wherein the controller is executable with instructions which, when executed, cause the controller to perform:

deciding an image forming apparatus, that enables to execute a first operation, to be a first designated apparatus for executing the first operation out of a plurality of image forming apparatuses capable of performing communication through the communication interface in accordance with predetermined decision criteria;

deciding an image forming apparatus, that is designated by a user of the portable terminal, to be a second designated apparatus for executing a second operation different from the first operation out of the plurality of image forming apparatuses capable of performing communication through the communication interface;

receiving an operation designation of designating at least one of the first operation and the second operation, through the user interface;

transmitting first instruction information that instructs to execute the first operation, to the first designated apparatus through the communication interface, when the first operation is designated in the operation designation; and transmitting second instruction information that instructs to execute the second operation, to the second designated apparatus through the communication interface, when the second operation is designated in the operation designation.

According to the above configuration of the non-transitory computer-readable medium and the portable terminal, the image forming apparatus conforming to the predetermined decision criteria is decided to be the first designated apparatus, and the image forming apparatus designated by the user of the portable terminal is decided to be the second designated apparatus. That is, it is possible to reduce a user's burden on the decision of the first designated apparatus, and it is possible to decide an image forming apparatus convenient for the user to be the second designated apparatus. As a result, it is possible to appropriately decide the image forming apparatus for executing each of the image forming operations by the simple user operation.

DETAILED DESCRIPTION

Hereinafter, an illustrative embodiment of the present disclosure will be described with reference to the drawings. In the meantime, the illustrative embodiment to be described later is just an example of the present disclosure, and the illustrative embodiment of the present disclosure can be appropriately changed without changing the gist of the present disclosure. For example, an execution sequence of each processing to be described later can be appropriately changed without changing the gist of the present disclosure.

Figure 1:
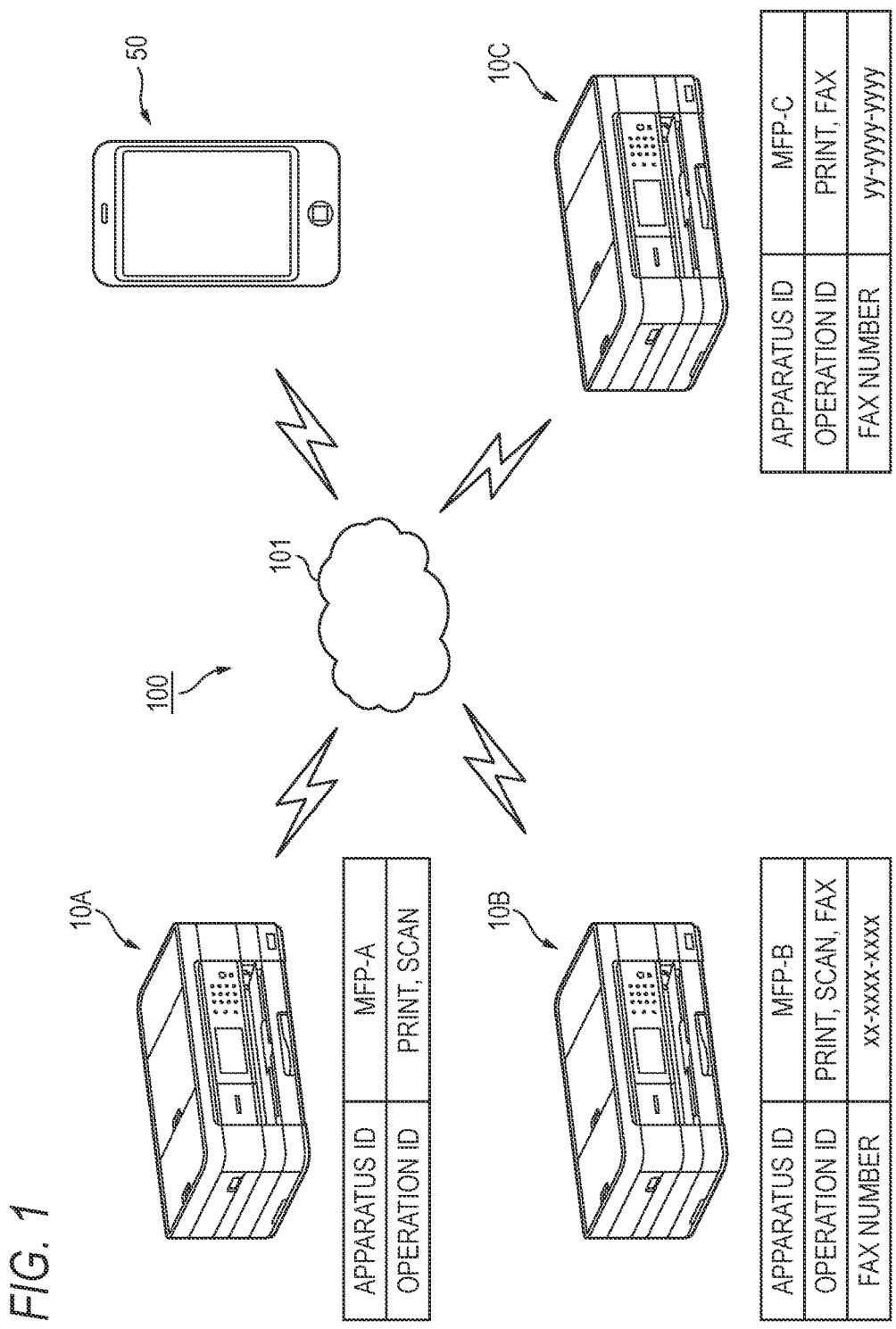
FIG. 1 is a schematic view of a system in accordance with an illustrative embodiment.

FIG. 1 is a schematic view of a system 100 in accordance with an illustrative embodiment. The system 100 shown in FIG. 1 includes multifunction peripheral products (MFPs) 10A, 10B, 10C which may also be collectively referred to as "MFP 10" in the below, and a portable terminal 50. The MFP 10 and the portable terminal 50 are configured to perform communication with each other via a communication network 101. The communication network 101 may be a wired LAN, a wireless LAN or a combination thereof, for example. Alternatively, the MFP 10 and the portable terminal 50 may also be connected by a USB cable or the like.

Figure 2A:
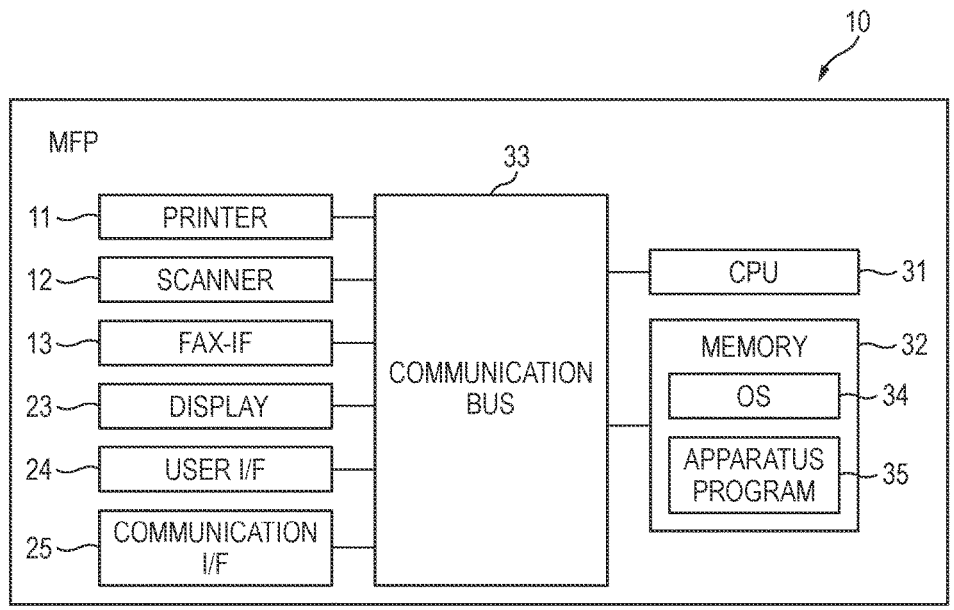
FIG. 2A is a block diagram of an MFP.

As shown in FIG. 2A, the MFP 10 mainly has a printer 11, a scanner 12, a FAX I/F 13, a display 23, an input I/F 24, a communication I/F 25, a CPU 31, a memory 32 and a communication bus 33. The respective constitutional elements configuring the MFP 10 are connected to each other through the communication bus 33. The MFP 10 is an example of the image processing apparatus configured to execute image forming operations. In the meantime, the MFPs 10A, 10B, 10C may be configured to execute at least one image processing operation. Also, the image processing operations that can be executed by the MFPs 10A, 10B, 10C may be different.

The printer 11 is hardware configured to execute a printing operation of recording an image to be expressed by image data onto a sheet. In the illustrative embodiment, the inkjet-type printer 11 configured to eject ink to record an image is exemplified. However, the recording method of the printer 11 may be an electrophotographic method or the like. The scanner 12 is hardware configured to execute a scanning operation of reading an image recorded on a document and generating image data (hereinafter, referred to as "scan data").

The printing operation is an image processing operation in which a physical output (i.e., a recording to a sheet) of an image to be processed is required. The scanning operation is an image processing operation in which a physical input (i.e., a reading of a document having an image recorded thereon) of an image to be processed is required. The image processing operation in which at least one of the physical input and output of the image to be processed is required is an example of the second operation. That is, the second operation indicates an image processing operation in which a user should perform an operation in the vicinity of the MFP 10 so as to check a result of the operation (i.e., to collect a sheet having an image recorded thereon) or to complete the operation (i.e., to set a document having an image recorded thereon). In the meantime, the specific examples of the second operation are not limited thereto. For example, the second operation may be a displaying an image to be processed on the display, and the like.

The FAX I/F 13 is hardware configured to execute a FAX transmission operation of FAX-transmitting image data to an external apparatus in accordance with a FAX protocol and a FAX reception operation of FAX-receiving image data from an external apparatus in accordance with the FAX protocol. More specifically, a modular jack of a FAX line can be detachably mounted to the FAX I/F 13. The FAX I/F 13 is configured to FAX-transmit or FAX-receive the image data through the connected FAX line. A telephone line that is provided by a telephone communication carrier such as NTT is an example of the FAX line.

The FAX transmission operation is an image processing operation of electrically outputting (i.e., transmission through the FAX line) the image data to the external apparatus. The FAX reception operation is an image processing operation of electrically inputting (i.e., receiving through the FAX line) the image data from the external apparatus. Hereinafter, the FAX transmission operation and the FAX reception operation may also be collectively referred to as "FAX operation". Also, the MFP 10 having the FAX I/F 13 may also be referred to as "FAX apparatus".

The image processing operation in which at least one of the electrical input and output of the image to be processed is required and neither of the physical input nor output of the image to be processed is required is an example of the first operation. That is, the first operation indicates an image processing operation in which a user is not necessarily required to perform an operation in the vicinity of the MFP 10 so as to check a result of the operation or to complete the operation. In the meantime, the specific examples of the first operation are not limited thereto. For example, the first operation may be an upload of transmitting the image data to the external apparatus through the communication network 101, a download of receiving the image data from the external apparatus through the communication network 101, and the like.

A FAX number is set for the FAX line. A phone number that is set by the telephone communication carrier is an example of the FAX number. The FAX number is an example of the line ID for identifying the FAX line connected to the FAX I/F 13. In the meantime, one FAX line may be branched by a divider, for example, and may be connected to each FAX I/F 13 of the plurality of MFPs 10. That is, the FAX I/Fs 13 of the plurality of MFPs 10 may be connected with the FAX lines identified by the same FAX number or may be connected with the FAX lines identified by the different FAX numbers.

The display 23 is a liquid crystal monitor, an organic EL display or the like, and has a display surface for displaying a variety of information.

The user I/F 24 is an interface configured to receive an input operation. Specifically, the user I/F 24 has buttons and is configured to output a variety of operation signals associated with the pushed buttons to the CPU 31. Also, the user I/F 24 may have a touch sensor having a film shape and superimposed on the display surface of the display 23. An operation of designating an object displayed on the display surface of the display 23 and an operation of inputting a character string or a number string are examples of the input operation. The "object" includes a character string, an icon, a button, a link, a radio button, a check box, a pull-down menu and the like displayed on the display 23, for example.

The user I/F 24 implemented as a touch sensor is configured to output position information indicative of a position on the display surface touched by a user of the portable terminal 50. Meanwhile, in the specification, the "touch" includes all operations of bringing an input medium into contact with the display surface. Also, although the input medium is not in contact with the display surface, "hover" or "floating touch" of bringing the input medium close to a position at which a distance between the input medium and the display surface is very small may be included in the concept of the "touch." Also, the input medium may be a user's finger, a touch pen or the like. An input operation of tapping a position of an object displayed on the display 23 is an example of the designation of designating the object operated by the user. Hereinafter, the designation of designating the object may be simply referred to as "designation of the object", "designation operation for the object", and the like.

The communication I/F 25 is an interface capable of performing communication with an external apparatus through the communication network 101. That is, the MFP 10 is configured to transmit a variety of information to the external apparatus through the communication I/F 25 and to receive a variety of information from the external apparatus through the communication I/F 25. Although a specific communication protocol of the communication I/F 25 is not particularly limited, Wi-Fi (registered trademark) can be adopted, for example. Also, when the MFP 10 and the portable terminal 50 are connected to each other by a USB cable, the communication I/F 25 may be a USB interface to which the USB cable can be detachably mounted.

The CPU 31 is configured to control overall operations of the MFP 10. The CPU 31 is configured to read out and execute a variety of programs (which will be described later) from the memory 32, based on a variety of information input through the user I/F 24 and a variety of information received from the external apparatus through the communication I/F 25. The CPU 31 and the memory 32 configure an example of the controller.

In the memory 32, an OS 34 and an apparatus program 35 are stored. The apparatus program 35 may be a single program or a set of a plurality of programs. Also, in the memory 32, data or information necessary to execute the apparatus program 35 is stored. The memory 32 is configured by a RAM, a ROM, an EEPROM, an HDD, a portable storage medium such as a USB memory to be detachably mounted to the MFP 10, a buffer of the CPU 31 or a combination thereof, for example.

The memory 32 may be a computer-readable storage medium. The computer-readable storage medium is a non-transitory medium. The non-transitory medium includes a recording medium such as a CD-ROM and a DVD-ROM as well as the above-described media. Also, the non-transitory medium is a tangible medium. In the meantime, an electric signal for carrying a program to be downloaded from a server or the like on the Internet is a computer-readable signal medium, which is a kind of the computer-readable medium, but is not included in the non-transitory computer-readable storage medium. This also applies to the memory 62 of the portable terminal 50, which will be described later.

An MIB (abbreviation of Management Information Base) of the memory 32 stores apparatus information shown in FIG. 1. The apparatus information includes an apparatus ID (for example, a MAC address, a model name and the like) for identifying the MFP 10, an operation ID for identifying an image processing operation that can be executed by the MFP 10, and a FAX number set for the FAX I/F 13. Meanwhile, in the apparatus information of the MFP 10A with no FAX I/F 13, the FAX number is not included. The FAX number may be input through the user I/F 24 or may be acquired from a switching equipment (not shown) through the FAX line connected to the FAX I/F 13, for example. Also, the apparatus information may include a station ID indicative of a name of an organization (for example, a company) in which the MFP 10 is equipped, in addition to or instead of the FAX number.

In the example of FIG. 1, the MFP 10A is identified with an apparatus ID "MFP-A", and can execute a printing operation and a scanning operation identified with operation IDs "print" and "scan". Also, the MFP 10B is identified with an apparatus ID "MFP-B", can execute a printing operation, a scanning operation, and a FAX operation identified with operation IDs "print", "scan" and "FAX", and is connected to a FAX line for which a FAX number "xx-xxxx-xxxx" is set. Also, the MFP 10C is identified with an apparatus ID "MFP-C", can execute a printing operation and a FAX operation identified with operation IDs "print" and "FAX", and is connected to a FAX line for which a FAX number "yy-yyyy-yyyy" is set.

Also, although not shown, the memory 32 of each of the MFPs 10B, 10C that can execute the FAX transmission operation can store therein a FAX number list. The FAX number list may include a plurality of FAX numbers. The FAX numbers to be included in the FAX number list are to identify external apparatuses that can be destinations of the FAX transmission in the FAX transmission operation. In the FAX number list, a FAX number input through the user I/F 54, for example, is registered.

Also, although not shown, the memory 32 of each of the MFPs 10B, 10C that can execute the FAX reception operation can store therein FAX data. The FAX data is image data that is FAX-received from an external apparatus in the FAX reception operation. The FAX reception operation is automatically executed at timing at which a call is received through the FAX line connected to the FAX I/F 13, for example, and does not require a trigger such as a user instruction through the user I/F 24 or the like. The apparatus program 35 is configured to store the FAX data, which is received through the FAX I/F 13 in the FAX reception operation, in the memory 32.

Figure 2B:
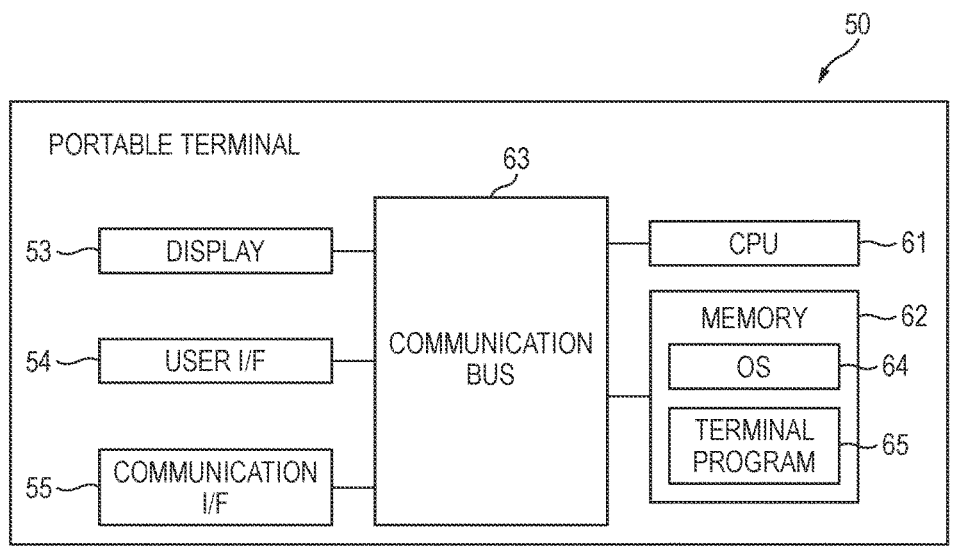
FIG. 2B is a block diagram of a portable terminal.
Figure 3:
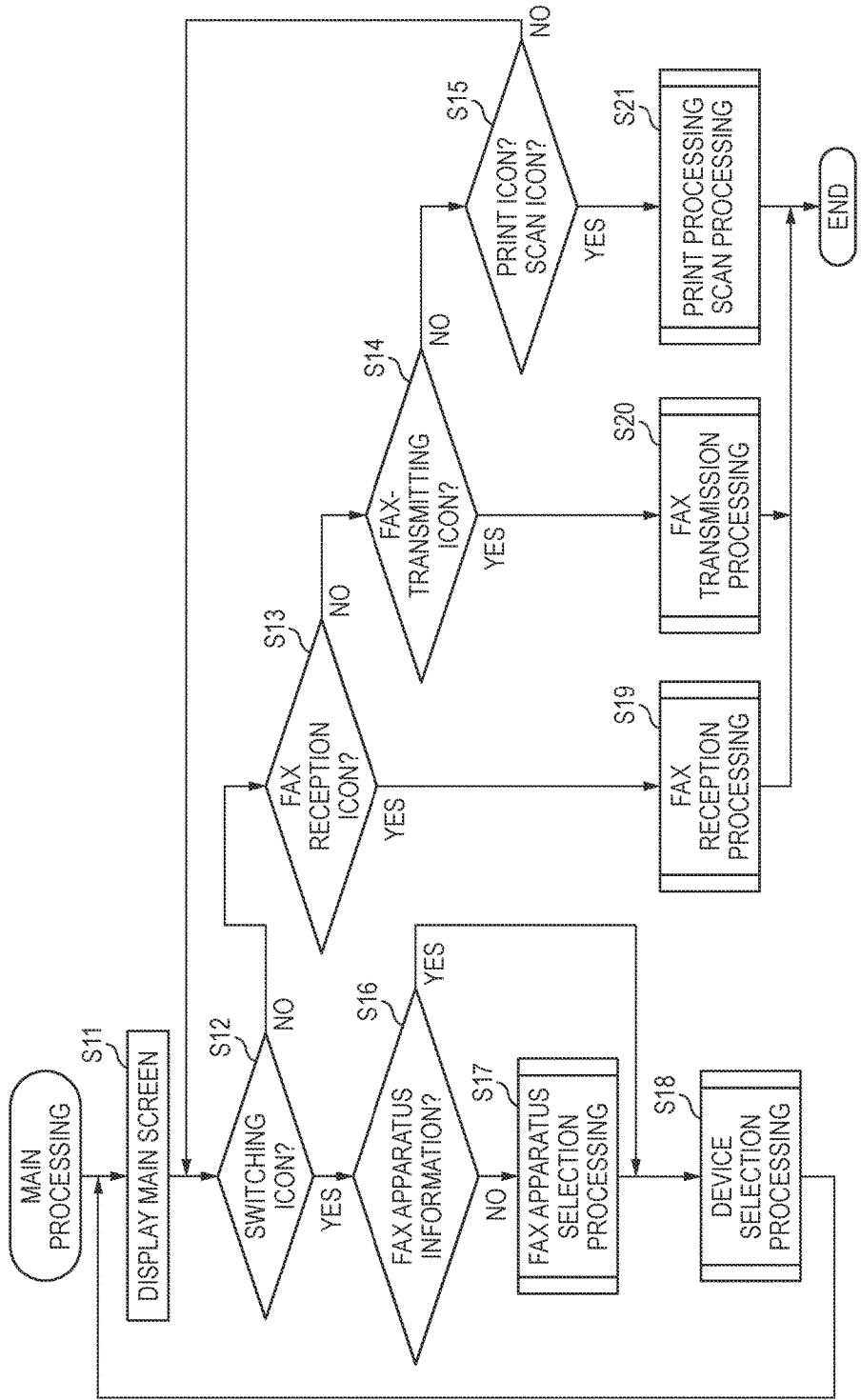
FIG. 3 is a flowchart of main processing.
Figure 4:
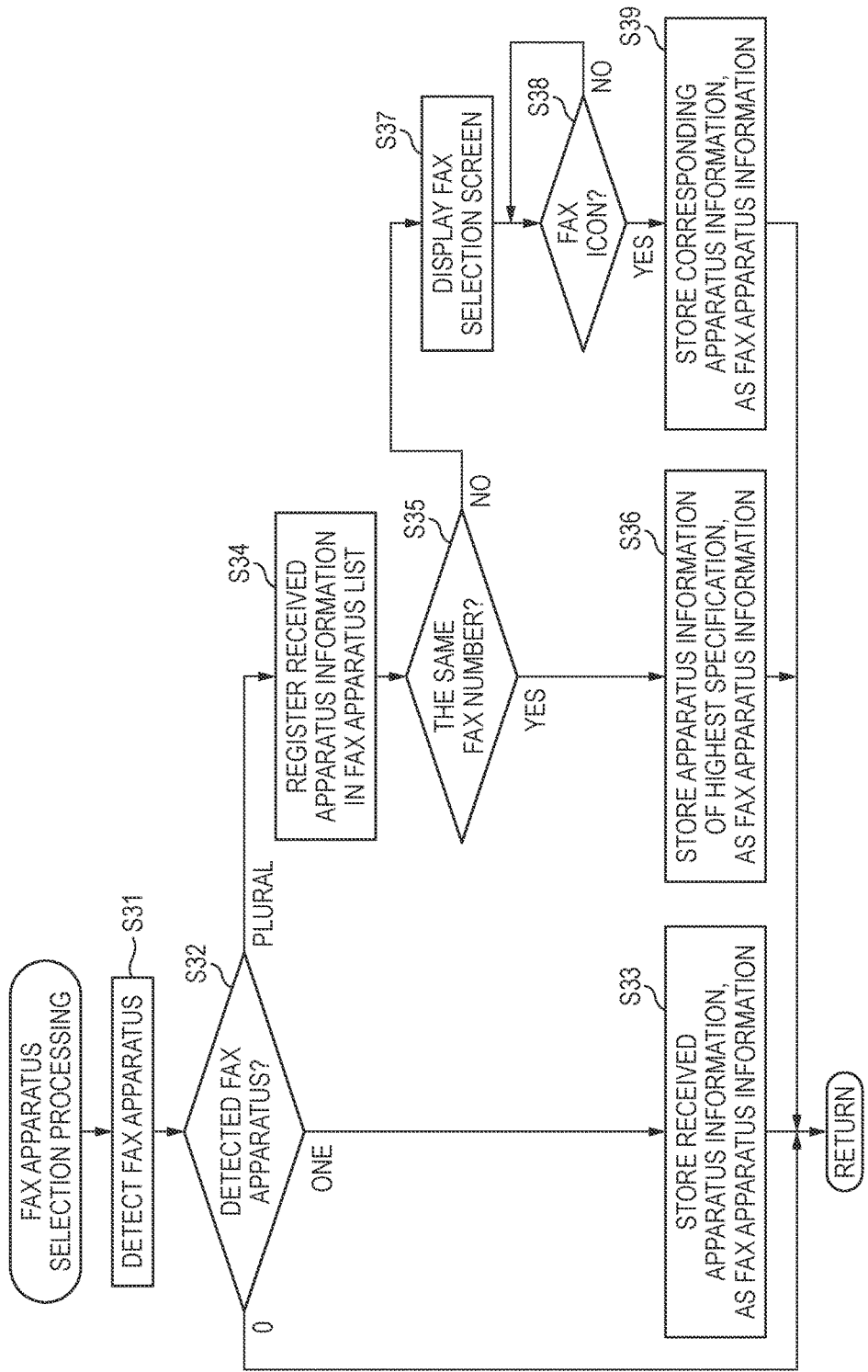
FIG. 4 is a flowchart of FAX apparatus selection processing.
Figure 5:
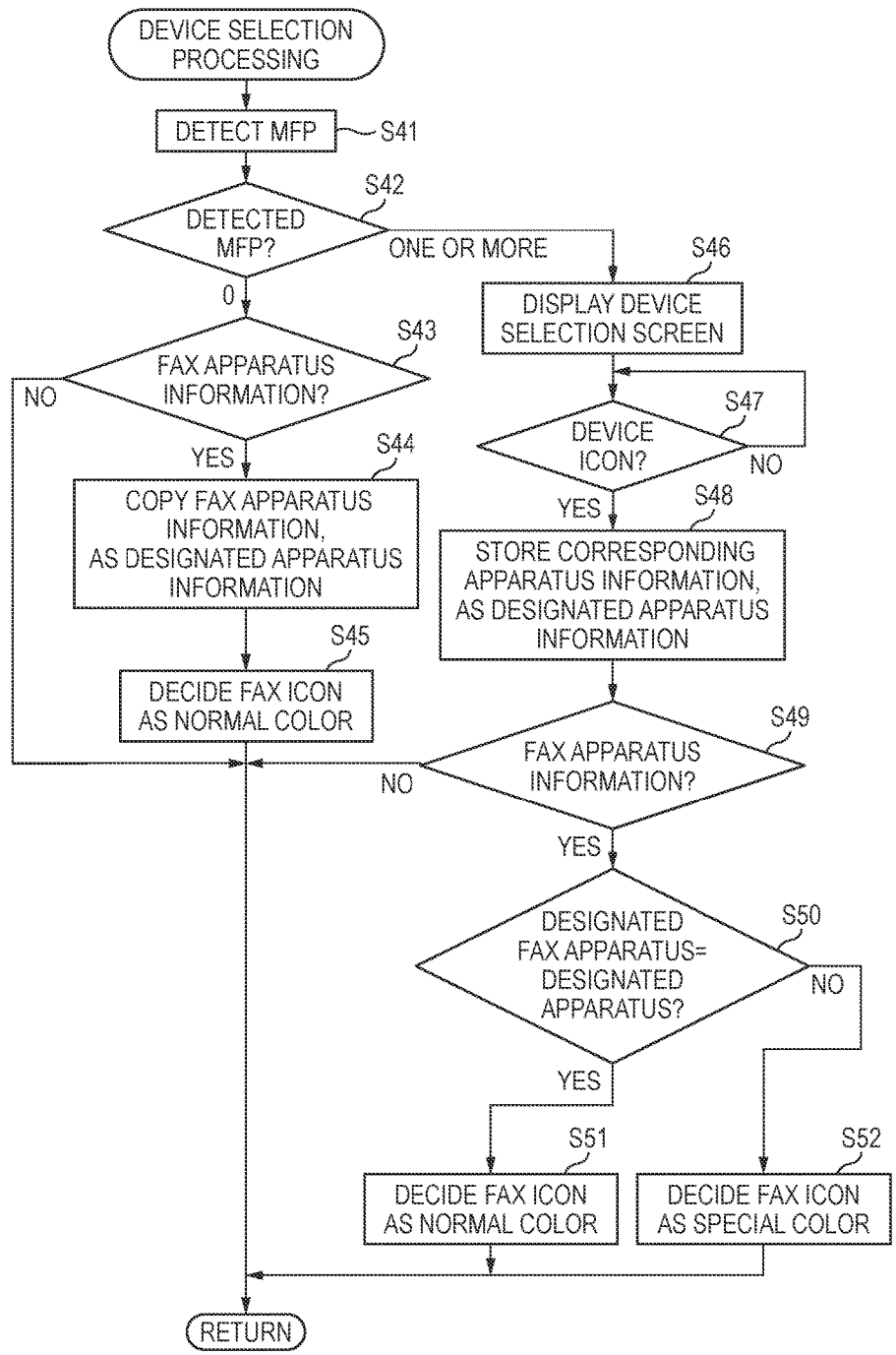
FIG. 5 is a flowchart of device selection processing.

As shown in FIG. 2B, the portable terminal 50 mainly has a display 53, a user I/F 54, a communication I/F 55, a CPU 61, a memory 62 and a communication bus 63. Since the display 53, the user I/F 54, the communication I/F 55, the CPU 61, the memory 62 and the communication bus 63 included in the portable terminal 50 have the similar configurations to the display 23, the user I/F 24, the communication I/F 25, the CPU 31, the memory 32 and the communication bus 33 included in the MFP 10, the descriptions thereof are omitted. The CPU 61 and the memory 62 configure an example of the controller.

The portable terminal 50 is a portable phone, a smart phone, a tablet terminal, or the like, for example. More specifically, the display 53 of the portable terminal 50 preferably has a display screen size of 12 inch or less, and more preferably 8 inch or less. Also, the user I/F 54 of the portable terminal 50 is preferably a touch sensor superimposed on the display surface of the display 53. In the memory 62, an OS 64 and a terminal program 65 are stored.

Also, although not shown, the memory 62 can store therein FAX apparatus information and designated apparatus information. The FAX apparatus information is apparatus information stored in the MIB of the MFP 10 (hereinafter, referred to as "designated FAX apparatus") selected in FAX apparatus selection processing, which will be described later. The designated apparatus information is apparatus information stored in the MIB of the MFP 10 (hereinafter, referred to as "designated apparatus") selected in device selection processing, which will be described later. In the meantime, the designated FAX apparatus and the designated apparatus may be the same MFP 10 or may be the different MFPs 10. The designated FAX apparatus is an example of the first designated apparatus, and the designated apparatus is an example of the second designated apparatus.

Also, although not shown, the memory 62 can store therein a FAX apparatus list. The FAX apparatus list is apparatus information stored in the MIB of a FAX apparatus (hereinafter, referred to as "alternative apparatus"), which is different from the designated FAX apparatus, of FAX apparatuses detected in S31, which will be described later. That is, the FAX apparatus list can include one or more apparatus information. The apparatus ID of the apparatus information registered in the FAX apparatus list is an example of the alternative apparatus ID, and the FAX number is an example of the alternative line ID.

Also, although not shown, the memory 62 may be provided with a data folder. In the data folder, photograph data, document data, presentation data, table calculation data and the like may be stored. The diverse data stored in the data folder is data that can be a target of the printing operation.

[Operations of System 100]

The operations of the system 100 of the illustrative embodiment are described with reference to FIGS. 3 to 8. Meanwhile, it is assumed that the FAX apparatus information and the designated apparatus information have not been stored in the memory 62 and the apparatus information has not been registered in the FAX apparatus list, upon start of main processing of FIG. 3.

A flowchart of the specification basically indicates processing that is to be executed by the CPUs 31, 61 in accordance with commands described in the program. That is, in the below descriptions, the processing of "determination", "extraction", "selection", "calculation", "decision", "specifying", "acquisition", "reception", "control" and the like indicates the processing of the CPUs 31, 61. The processing that is to be executed by the CPUs 31, 61 includes hardware controls through the OSs 34, 64, too. In the meantime, "acquisition" is used as a concept in which request is not necessarily required. That is, the processing in which data is received without the CPU 61 requesting the same is also included in the concept that "the CPU 61 acquires data". Also, in the specification, "data" is expressed by a bit string that can be read by a computer. The data having substantially the same meaning and the different formats is handled as the same data. This also applies to the "information" of the specification.

Figure 9A:
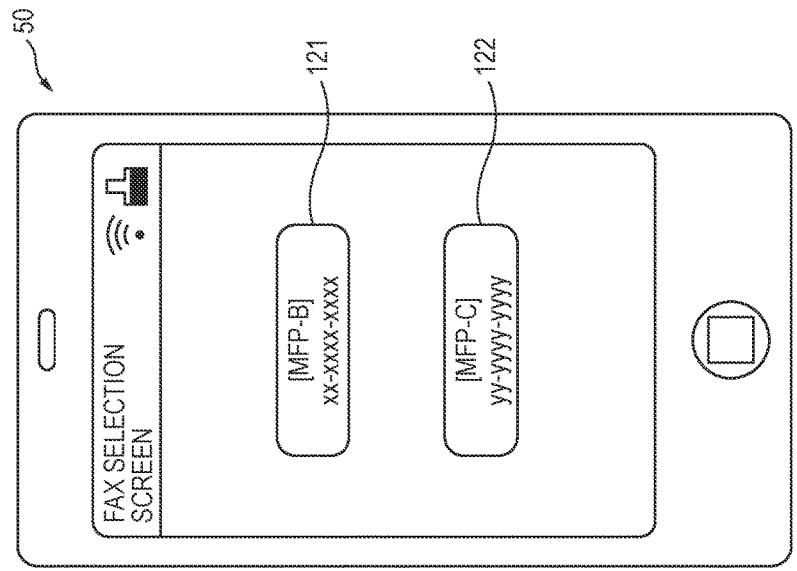
FIG. 9A depicts an example of a main screen on a display at a state where a designated apparatus has not been designated yet.

First, the terminal program 65 displays a main screen shown in FIG. 9A on the display 53 (S11). The main screen includes operation icons 111, 112, 113, 114, and a switching icon 115. The terminal program 65 receives an input operation on the main screen through the user I/F 54 (S12 to S15).

The processing of S11 is an example of the display processing, and the processing of S12 to S15 is an example of the first reception processing.

The operation icon 111 is an example of the second object corresponding to the printing operation, the operation icon 112 is an example of the second object corresponding to the scanning operation, the operation icon 113 is an example of the first object corresponding to the FAX reception operation, and the operation icon 114 is an example of the first object corresponding to the FAX transmission operation. The switching icon 115 is an example of the switching object corresponding to the instruction to switch the designated apparatus. The main screen that is displayed when the designated apparatus information has not been stored in the memory 62 includes all the operation icons 111 to 114, and the switching icon 115 on which a character string "not selected" indicating that the designated apparatus has not been designated is described. Also, in this case, a background color of the operation icons 111 to 114 is a normal color (for example, white).

Then, when a designation of the switching icon 115 is received through the user I/F 54 (S12: Yes), the terminal program 65 determines whether the FAX apparatus information is stored in the memory 62 (S16). When it is determined that the FAX apparatus information is not stored in the memory 62 (S16: No), the terminal program 65 executes FAX apparatus selection processing (S17). The FAX apparatus selection processing is processing of selecting a designated FAX apparatus in accordance with predetermined decision criteria. The FAX apparatus selection processing is described in detail with reference to FIG. 4.

First, the terminal program 65 detects the MFP 10, which can perform communication with the portable terminal 50 and of which the FAX I/F 13 is connected to the FAX line, in the communication network 101 (S31). The terminal program 65 broadcasts first response request information to the communication network 101 through the communication I/F 55, for example. The first response request information is information for requesting the MFP 10, of which the FAX I/F 13 is connected to the FAX line, to transmit the apparatus information. Then, the terminal program 65 receives the apparatus information transmitted from the MFPs 10B, 10C through the communication I/F 55, as a response to the first response request information. That is, the terminal program 65 detects the MFPs 10B, 10C, which are transmission sources of the apparatus information, as the MFP 10 which can perform communication and the FAX line is connected thereto. In the meantime, as the method of detecting the MFP 10 which can perform communication and the FAX line is connected thereto, the other well-known methods can also be adopted. The processing of S31 is an example of the first detection processing.

Then, the terminal program 65 determines the number of the FAX apparatuses detected in S31 (in other words, the number of the apparatus information received in S31) (S32). In the example of FIG. 1, the FAX apparatuses are two. On the other hand, when it is determined that the FAX apparatus has not been detected (S32: 0), the terminal program 65 ends the FAX apparatus selection processing without executing the processing of S33 to S39. Also, when it is determined that only one FAX apparatus has been detected (S32: 1), the terminal program 65 stores, in the memory 62, the apparatus information received in S31, as the FAX apparatus information (S33), and ends the FAX apparatus selection processing. The processing of S33 is an example of the first decision processing.

Like the example of FIG. 1, when it is determined that the plurality of FAX apparatuses has been detected (S32: plural), the terminal program 65 registers all the apparatus information received in S31, in the FAX apparatus list (S34). That is, in the example of FIG. 1, the apparatus information of the MFPs 10B, 10C is registered in the FAX apparatus list. The processing of S34 is an example of the storing processing. Then, the terminal program 65 determines whether the FAX numbers included in the plurality of apparatus information received in S31 are the same (S35). The processing of S35 is an example of the first determination processing of determining whether the FAX lines connected to the plurality of MFPs 10B, 10C detected in S31 are the same. In the example of FIG. 1, the MFPs 10B, 10C are connected with the different FAX lines.

The method of determining whether the FAX lines connected to the MFPs 10B, 10C detected in S31 are the same in S35 is not limited to the above example. As another example, the system 100 may include a server in which the apparatus ID of the FAX apparatus connected to the communication network 101 is stored in association with the FAX number of the FAX line connected to the FAX apparatus. The apparatus ID and FAX number stored in the server are set by a manager of the system 100, for example. The terminal program 65 transmits inquiry information, each of which includes the apparatus ID of each of the plurality of apparatus information received in S31, to the server through the communication I/F 55. Then, the terminal program 65 receives, as a response to each of the plurality of transmitted inquiry information, the FAX number corresponding to the apparatus ID included in the inquiry information, through the communication I/F 55. Then, the terminal program 65 may determine whether the plurality of FAX numbers received from the server is the same.

On the other hand, when it is determined that the FAX lines connected to the MFPs 10B, 10C are the same (S35: Yes), the terminal program 65 stores, in the memory 62, the apparatus information of the MFP 10B, which has the highest specification, of the MFPs 10B, 10C detected in S31, as the FAX apparatus information (S36). Also, the terminal program 65 deletes the apparatus information of the MFP 10B registered in the FAX apparatus list in S34, from the FAX apparatus list. The processing of S36 is an example of the first decision processing of deciding, as the designated FAX apparatus, the MFP 10B for which the terminal program 65 has determined that it conforms to the predetermined condition of the highest specification. Also, the decision criterion of S36 is an example of the first decision criterion.

In the meantime, the specification of the MFP 10 may be determined by the number of the executable image forming operations, for example. In this case, the MFP 10B that can execute the printing operation, the scanning operation, the FAX transmission operation and the FAX reception operation is determined to have the higher specification than the MFP 10C that can execute the printing operation, the FAX transmission operation and the FAX reception operation. However, the specific method of determining the high-and-low level of the specification is not limited to the above example. For example, the high-and-low level of the specification may be determined by determining whether an image can be recorded on an A3 sheet, whether a color image can be recorded on a sheet, or a combination thereof.

Figure 9B:
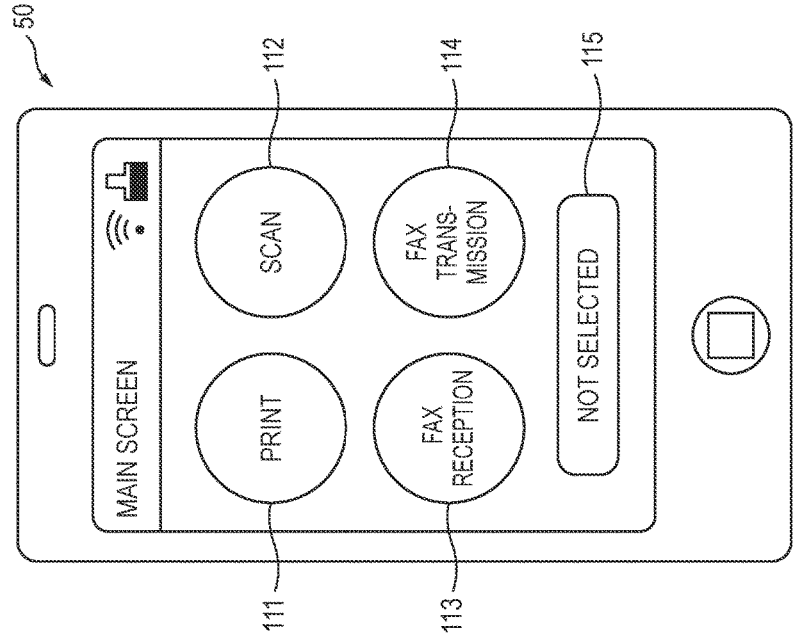
FIG. 9B depicts an example of a FAX selection screen on the display.

On the other hand, when it is determined that the FAX lines connected to the MFPs 10B, 10C are different (S35: No), like the example of FIG. 1, the terminal program 65 displays a FAX selection screen shown in FIG. 9B on the display 53 (S37). In the example of FIG. 1, the terminal program 65 displays, on the display 53, a FAX selection screen including FAX icons 121, 122 corresponding to the MFPs 10B, 10C detected in S31. Each of the FAX icons 121, 122 is described thereon with the apparatus ID and the FAX number included in the apparatus information of the corresponding MFP 10. Then, the terminal program 65 receives an input operation on the FAX selection screen, through the user I/F 54 (S38).

Then, when it is determined that a designation of the FAX icon 121, for example, is received through the user I/F 54 (S38: Yes), the terminal program 65 stores, in the memory 62, the apparatus information of the MFP 10B corresponding to the designated FAX icon 121, as the FAX apparatus information (S39). Also, the terminal program 65 deletes the apparatus information of the MFP 10B registered in the FAX list in S34, from the FAX apparatus list. The processing of S39 is an example of the first decision processing of deciding the MFP 10 designated through the user I/F 54, as the designated FAX apparatus. Also, the decision criterion in S39 is an example of the second decision criterion.

Returning to FIG. 3, the terminal program 65 executes device selection processing (S18). On the other hand, when it is determined that the FAX apparatus information has been already stored in the memory 62 (S16: Yes), the terminal program 65 executes the device selection processing without executing the FAX apparatus selection processing. The device selection processing is processing of selecting a designated apparatus in accordance with a user's instruction. The device selection processing is described in detail with reference to FIG. 5.

First, the terminal program 65 detects the MFP 10 that can perform communication with the portable terminal 50, in the communication network 101 (S41). The terminal program 65 broadcasts second response request information to the communication network 101 through the communication I/F 55, for example. The second response request information is information for requesting the MFP 10 having received the second response request information to transmit the apparatus information. Then, the terminal program 65 receives the apparatus information transmitted from the MFPs 10A, 10B, 10C, as a response to the second response request information, through the communication I/F 55. That is, the terminal program 65 detects the MFPs 10A, 10B, 10C, which are transmission sources of the apparatus information, as the MFP 10 which can perform communication. In the meantime, as the method of detecting the MFP 10 which can perform communication, the other well-known methods can also be adopted. The processing of S41 is an example of the second detection processing.

Then, the terminal program 65 determines whether the MFP 10 has been detected in S41 (in other words, whether the apparatus information has been received in S41) (S42). In the example of FIG. 1, the MFPs 10A, 10B, 10C are detected. On the other hand, when it is determined that the MFP 10 has not been detected in S41 (S42: 0), the terminal program 65 determines whether the FAX apparatus information is stored in the memory 62 (S43). The processing of S43 is an example of the sixth determination processing.

Then, when it is determined that the FAX apparatus information is stored in the memory 62 (S43: Yes), the terminal program 65 copies the FAX apparatus information stored in the memory 62, and stores the same in the memory 62, as the designated apparatus information (S44). The processing of S44 is an example of the second decision processing of deciding the designated FAX apparatus, as the designated apparatus. Then, the terminal program 65 decides a background color of the operation icons 113, 114 of the main screen to be displayed, as a normal color (S45), and ends the device selection processing. On the other hand, when it is determined that the FAX apparatus information is not stored in the memory 62 (S43: No), the terminal program 65 ends the device selection processing without executing the processing of S44 to S45.

Figure 10A:
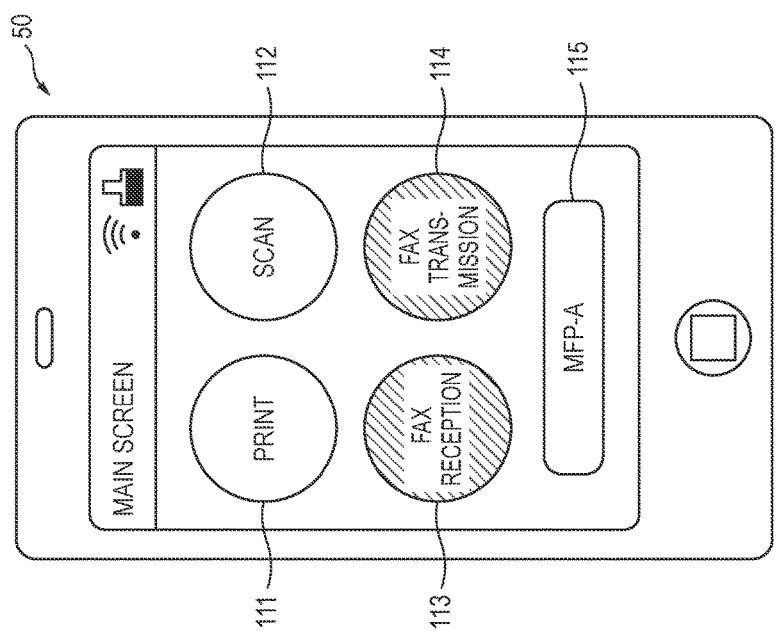
FIG. 10A depicts an example of a device selection screen on the display.

On the other hand, when it is determined that one or more MFPs 10 have been detected in S41 (S42: one or more), the terminal program 65 displays a device selection screen shown in FIG. 10A on the display 53 (S46). In the example of FIG. 1, the terminal program 65 displays, on the display 53, the device selection screen including device icons 131, 132, 133 corresponding to the MFPs 10A, 10B, 10C detected in S41. Each of the device icons 131 to 133 are described thereon with the apparatus ID included in the apparatus information of the corresponding MFP 10. Then, the terminal program 65 receives an input operation on the device selection screen, through the user I/F 54 (S47). The processing of S47 is an example of the fourth reception processing.

Then, when a designation of the device icon 131, for example, is received through the user I/F 54 (S47: Yes), the terminal program 65 stores, in the memory 62, the apparatus information of the MFP 10A corresponding to the designated device icon 131, as the designated apparatus information (S48). On the other hand, when the designated apparatus information has been already stored in the memory 62, the terminal program 65 overwrites the designated apparatus information with the new designated apparatus information. The processing of S48 is an example of the second decision processing of deciding the MFP 10 designated by the user, as the designated apparatus. That is, the tapping of the device icon 131 is an example of the designation of the MFP 10A through the user I/F 54.

Then, the terminal program 65 determines whether the FAX apparatus information is stored in the memory 62 (S49). When it is determined that the FAX apparatus information is not stored in the memory 62 (S49: No), the terminal program 65 ends the device selection processing without executing the processing of S50 to S52. On the other hand, when it is determined that the FAX apparatus information is stored in the memory 62 (S49: Yes), the terminal program 65 determines whether the FAX apparatus information stored in the memory 62 is the same as the apparatus ID of the designated apparatus information (i.e., whether the designated FAX apparatus is the same as the designated apparatus) (S50).

When it is determined that the designated FAX apparatus is the same as the designated apparatus (S50: Yes), the terminal program 65 decides the background color of the operation icons 113, 114 of the main screen to be displayed, as a normal color (S51), and ends the device selection processing. On the other hand, when it is determined that the designated FAX apparatus is different from the designated apparatus (S50: No), the terminal program 65 decides the background color of the operation icons 113, 114 of the main screen to be displayed, as a special color (for example, gray) (S52), and ends the device selection processing.

Figure 10B:
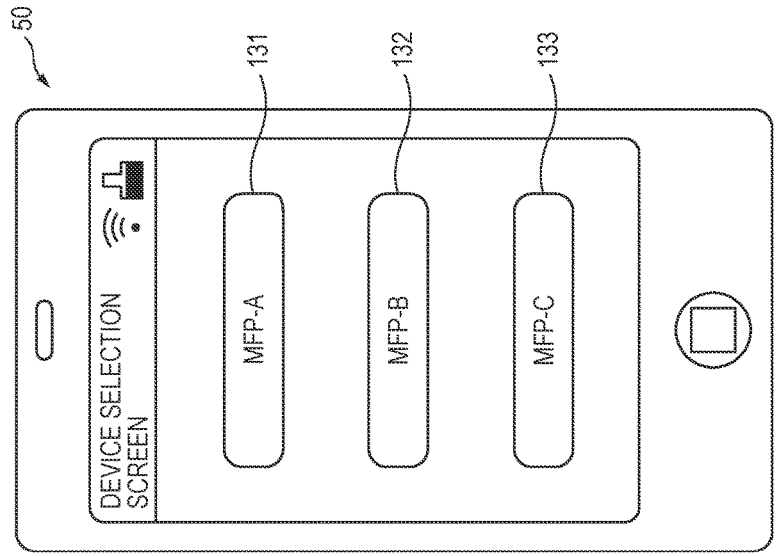
FIG. 10B depicts an example of the main screen on the display when a designated FAX apparatus and a designated apparatus are different from each other.

Returning to FIG. 3, the terminal program 65 displays a main screen shown in FIG. 10B on the display 53 (S11). FIG. 10B depicts a display example of the main screen that is displayed when the MFP 10B is decided as the designated FAX apparatus and the MFP 10A is decided the designated apparatus. That is, the main screen shown in FIG. 10B is different from the main screen shown in FIG. 9A, in that the background color of the operation icons 113, 114 is the special color and the apparatus ID "MFP-A" of the designated apparatus is described on the switching icon 115.

In the meantime, the background color of the operation icons 111, 112 is always the normal color. That is, when the designated FAX apparatus and the designated apparatus are the same, the terminal program 65 displays the operation icons 111 to 114 in a common display aspect. On the other hand, when the designated FAX apparatus and the designated apparatus are different from each other, the terminal program 65 displays the operation icons 111, 112 and the operation icons 113, 114 in different display aspects. However, the specific method of displaying the operation icons 111 to 114 in the different display aspects is not limited to the method of changing the background color. As another example, the terminal program 65 may add a batch image, which indicates that the designated FAX apparatus and the designated apparatus are different from each other, to the operation icons 113, 114.

Then, when a designation of the operation icon 113 shown in FIG. 10B is received through the user I/F 54 (S13: Yes), the terminal program 65 executes FAX reception processing (S19). The tapping of the operation icon 113 is an example of the designation of the FAX reception operation. The FAX reception processing is processing of enabling the designated apparatus to execute the printing operation for the FAX data FAX-received through the FAX line (hereinafter, referred to as "designated FAX line") connected to the designated FAX apparatus. The FAX reception processing is described in detail with reference to FIG. 6.

First, the terminal program 65 transmits transmission instruction information to the MFP 10B indicated by the FAX apparatus information, through the communication I/F 55 (S61). The transmission instruction information is an example of the first instruction information that instructs transmission of the FAX data received in the FAX reception operation. The processing of S61 is an example of the first instruction processing. In the meantime, although not shown, the apparatus program 35 of the MFP 10B receives the transmission instruction information from the portable terminal 50 through the communication I/F 25. Then, the apparatus program 35 reads out the FAX data stored in the memory 32. Then, the apparatus program 35 transmits the read FAX data to the portable terminal 50, as a response to the transmission instruction information, through the communication I/F 25.

Then, the terminal program 65 receives the FAX data, as a response to the transmission instruction information, from the MFP 10B through the communication I/F 55. This processing is an example of the second receiving processing. Then, the terminal program 65 temporarily stores the FAX data received in S61 in the memory 62, in association with the apparatus ID "MFP-B" of the designated FAX apparatus. Then, the terminal program 65 determines whether the apparatus information including the alternative FAX number, which is the same as the designated FAX number "xx-xxxx-xxxx", is registered in the FAX apparatus list (S62). The processing of S62 is an example of the fifth determination processing. In the example of FIG. 1, in the FAX apparatus list, the apparatus information including the alternative FAX number, which is the same as the designated FAX number "xx-xxxx-xxxx", is not registered.

On the other hand, when it is determined that the apparatus information including the alternative FAX number, which is the same as the designated FAX number, is registered in the FAX apparatus list (S62: Yes), the terminal program 65 receives the FAX data from the alternative apparatus indicated by the apparatus information (S63). The processing of S63 is an example of the third receiving processing, and the specific processing content thereof is common to the processing of S61. Then, the terminal program 65 temporarily stores the FAX data received in S63 in the memory 62, in association with the alternative apparatus ID for identifying the alternative apparatus. On the other hand, like the example of FIG. 1, when it is determined that the apparatus information including the alternative FAX number, which is the same as the designated FAX number, is not registered in the FAX apparatus list (S62: No), the terminal program 65 executes processing of S64 and thereafter, without executing the processing of S63.

Figure 11A:
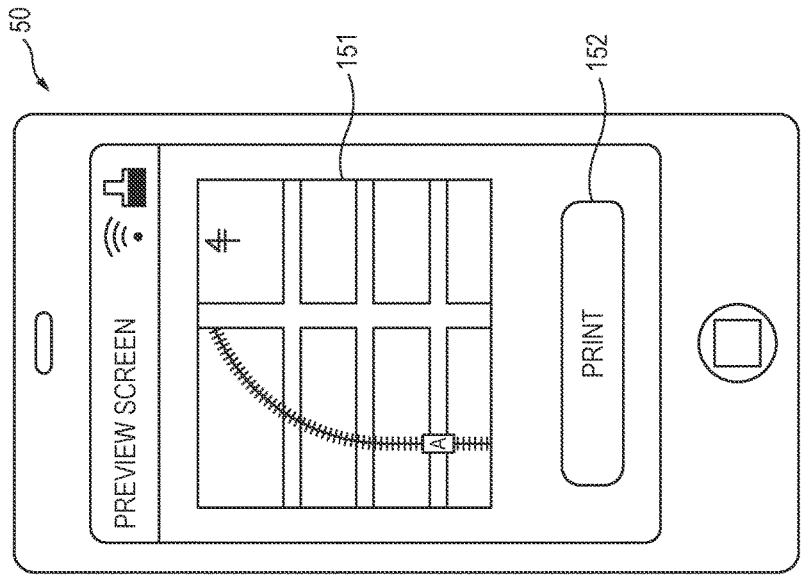
FIG. 11A depicts an example of a data selection screen on the display.

Then, the terminal program 65 displays a data selection screen shown in FIG. 11A on the display 53 (S64). The data selection screen includes data icons 141, 142, 143 corresponding to the FAX data received in S61 and S63. In the FAX data, the apparatus ID associated with the FAX data, and a character string (for example, a file name, date and time of FAX reception, and the like) for identifying the FAX data are described. That is, FIG. 11A depicts an example of the data selection screen that is displayed when the FAX data A, B is received from the MFP 10B, which is the designated FAX apparatus, and the FAX data C is received from the MFP 10C, which is the alternative apparatus. Then, the terminal program 65 receives an input operation on the data selection screen, through the user I/F 54 (S65). The processing of S65 is an example of the third reception processing.

Figure 11B:
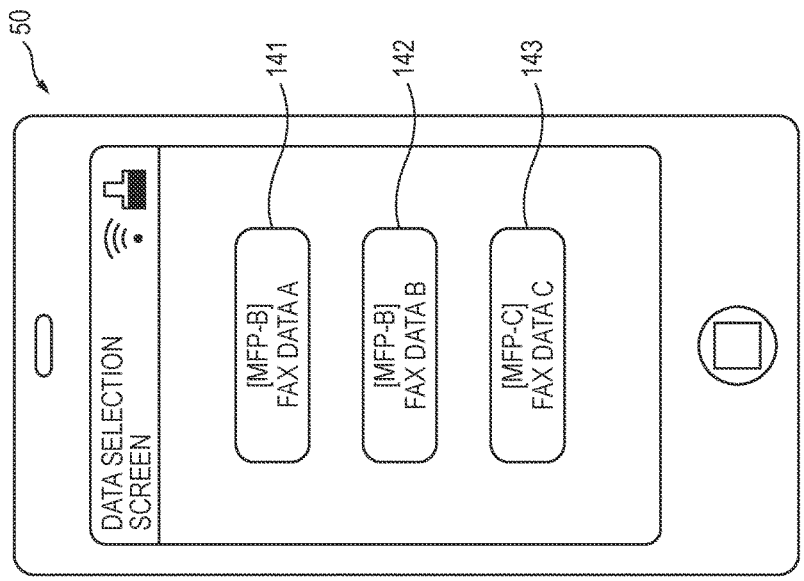
FIG. 11B depicts an example of a preview screen on the display.

Then, when a designation of the data icon 142, for example, is received through the user I/F 54 (S65: Yes), the terminal program 65 displays a preview screen shown in FIG. 11B on the display 53 (S66). The preview screen includes a preview image 151 and a [print] icon 152. The preview image 151 is an image indicating a state where an image expressed by the FAX data B corresponding to the designated data icon 142 is recorded on a sheet. Then, the terminal program 65 receives an input operation on the preview screen, through the user I/F 54 (S67).

Then, when a designation of the [print] icon 152 is received through the user I/F 54 (S67: Yes), the terminal program 65 transmits print instruction information to the MFP 10A indicated by the designated apparatus information, through the communication I/F 55 (S68). The print instruction information is information that instructs execution of the printing operation for the designated FAX data. The print instruction information includes the FAX data B corresponding to the data icon 142, for example. The processing of S68 is an example of the output instruction processing and the print instruction processing, and the print instruction information is an example of the output instruction information.

In the meantime, although not shown, the apparatus program 35 of the MFP 10A receives the print instruction information from the portable terminal 50, through the communication I/F 25. Then, the apparatus program 35 enables the printer 11 to execute the printing operation in accordance with the received print instruction information. That is, the printer 11 records an image, which is expressed by the FAX data B included in the print instruction information, on a sheet. Then, the user of the portable terminal 50 may come back to the MFP 10A so as to collect the sheet on which the image expressed by the FAX data B is recorded.

Returning to FIG. 3, when a designation of the operation icon 114 shown in FIG. 10B is received through the user I/F 54 (S14: Yes), the terminal program 65 executes FAX transmission processing (S20). The tapping of the operation icon 114 is an example of the designation of the FAX transmission operation. The FAX transmission processing is processing of enabling the designated FAX apparatus to execute the FAX transmission operation. The FAX transmission processing is described in detail with reference to FIG. 7.

Figure 12A:
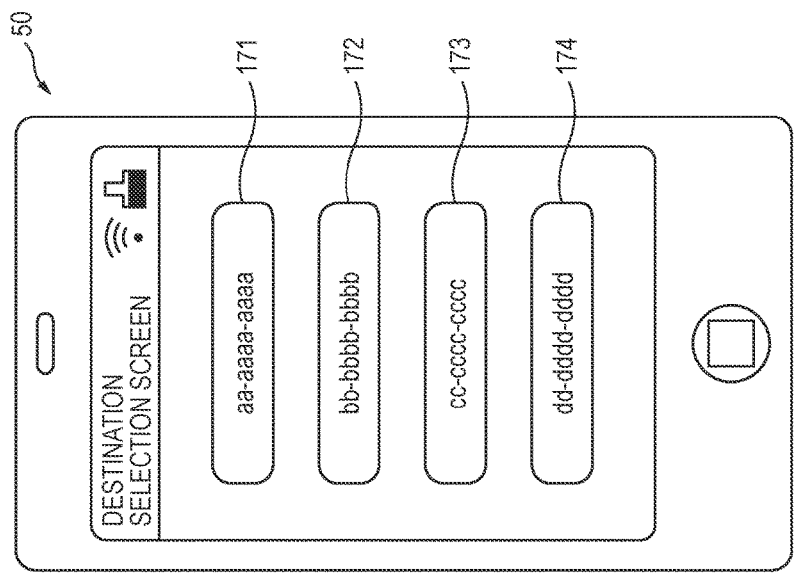
FIG. 12A depicts an example of a preparation instruction screen on the display.

First, the terminal program 65 displays a preparation instruction screen shown in FIG. 12A on the display 53 (S71). The preparation instruction screen includes a message "Please set a document on "MFP-A" and push [start].", and a [start] icon 160. The apparatus ID "MFP-A" included in the message is the apparatus ID included in the designated apparatus information. Then, the terminal program 65 receives an input operation on the preparation instruction screen, through the user I/F 54 (S72). The user seeing the preparation instruction screen may set a document having an image to be FAX-transmitted on the scanner 12 of the MFP 10A, and then tap the [start] icon 160 of the preparation instruction screen.

Then, when a designation of the [start] icon 160 is received through the user I/F 54 (S72: Yes), the terminal program 65 transmits scan instruction information to the MFP 10A indicated by the designated apparatus information, through the communication I/F 55 (S73). The scan instruction information is information that instructs execution of the scanning operation. The processing of S73 is an example of the generation instruction processing and the scan instruction processing, and the scan instruction information is an example of the generation instruction information.

In the meantime, although not shown, the apparatus program 35 of the MFP 10A receives the scan instruction information from the portable terminal 50, through the communication I/F 25. Then, the apparatus program 35 enables the scanner 12 to execute the scanning operation in accordance with the received scan instruction information. That is, the scanner 12 reads an image recorded on the document set on a contact glass or ADF, and generates scan data. Then, the apparatus program 35 transmits the scan data generated by the scanner 12 to the portable terminal 50 through the communication I/F 25, as a response to the scan instruction information.

Then, the terminal program 65 receives the scan data, as a response to the scan instruction information, from the MFP 10A through the communication I/F 55 (S74: Yes). Then, the terminal program 65 temporarily stores the received scan data in the memory 62. The processing of S74 is an example of the first receiving processing.

Then, the terminal program 65 acquires the FAX number list from the MFP 10B indicated by the FAX apparatus information (S75). More specifically, the terminal program 65 transmits list request information to the MFP 10B, through the communication I/F 55. Then, the terminal program 65 receives the FAX number list stored in the memory 32 of the MFP 10B, as a response to the list request information, from the MFP 10B through the communication I/F 55.

Figure 12B:
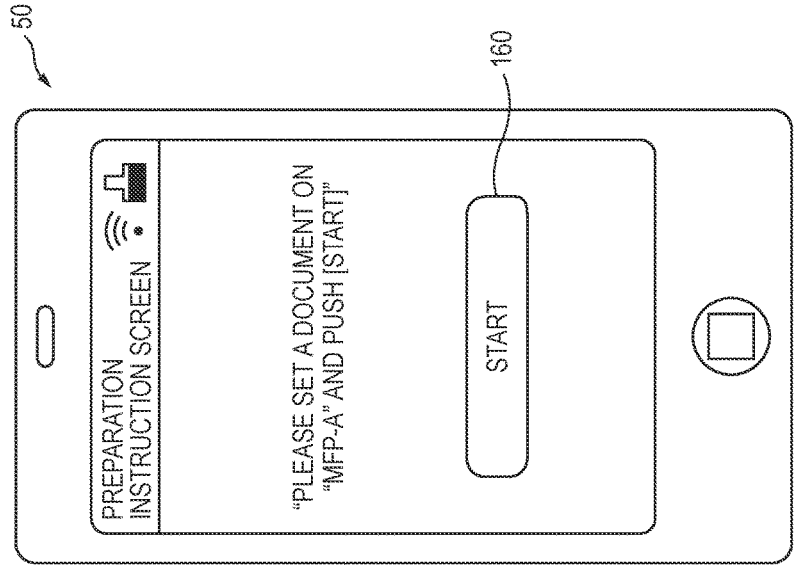
FIG. 12B depicts an example of a destination selection screen on the display.

Then, the terminal program 65 displays a destination selection screen shown in FIG. 12B on the display 53 (S76). The destination selection screen includes destination icons 171, 172, 173, 174 corresponding to the FAX numbers included in the FAX number list received in S75. Each of the destination icons 171 to 174 is described thereon with the corresponding FAX number. Then, the terminal program 65 receives an input operation on the destination selection screen, through the user I/F 54 (S77).

Then, when a designation of the destination icon 173, for example, is received through the user I/F 54 (S77: Yes), the terminal program 65 temporarily stores the FAX number "cc-cccc-cccc" corresponding to the designated destination icon 173, in the memory 62. Then, the terminal program 65 executes FAX instruction processing (S78). The FAX instruction processing is processing of instructing the FAX apparatus to execute the FAX transmission operation. The FAX instruction processing is described in detail with reference to FIG. 8.

First, the terminal program 65 transmits FAX transmission instruction information to the MFP 10B indicated by the FAX apparatus information, through the communication I/F 55 (S81). The FAX transmission instruction information is an example of the first instruction information that instructs execution of the FAX transmission operation. The FAX transmission instruction information includes the scan data received in S74 and the FAX number "cc-cccc-cccc" corresponding to the destination icon 173 designated in S77. The processing of S81 is an example of the first instruction processing. Then, the terminal program 65 stands by until result information, which indicates a result of the FAX transmission operation executed in accordance with the FAX transmission instruction information, is received (S82).

In the meantime, although not shown, the apparatus program 35 of the MFP 10B receives the FAX transmission instruction information from the portable terminal 50, through the communication I/F 25. Then, the apparatus program 35 enables the FAX I/F 13 to execute the FAX transmission operation in accordance with the received FAX transmission instruction information. That is, the FAX I/F 13 FAX-transmits the scan data included in the FAX transmission instruction information to the external apparatus, which is identified with the FAX number "cc-cccc-cccc" included in the FAX transmission instruction information.

When the FAX transmission operation is normally completed, the apparatus program 35 transmits result information "completion" to the portable terminal 50, through the communication I/F 55. Also, when the other data is being transmitted or received (i.e., "during use", "during call") through the FAX line connected to the FAX I/F 13 at timing at which the FAX transmission instruction information is received, the apparatus program 35 transmits the result information "line BUSY" to the portable terminal 50, through the communication I/F 55. Also, when the printer 11, the scanner 12, and the FAX I/F 13 are executing the other image forming operations at timing at which the FAX transmission instruction information is received, the apparatus program 35 transmits result information "apparatus BUSY" to the portable terminal 50, through the communication I/F 55. Also, the apparatus program 35 may store, in the memory 62, the result information transmitted to the portable terminal 50.

Then, the terminal program 65 determines the content of the result information received from the MFP 10B through the communication I/F 55 (S82). The processing of S82 is an example of the second determination processing. When it is determined that the result information "completion" has been received (S82: completion), the terminal program 65 ends the FAX instruction processing.

Also, when it is determined that the result information "line BUSY" has been received (S82: BUSY), the terminal program 65 determines whether the apparatus information, which includes the alternative FAX number different from the FAX number "xx-xxxx-xxxx" of the FAX apparatus information, is registered in the FAX apparatus list (S83). The processing of S83 is an example of the third determination processing. In the example of FIG. 1, in the FAX apparatus list, the apparatus information, which includes the alternative FAX number "yy-yyyy-yyyy" different from the FAX number "xx-xxxx-xxxx", is registered.

When it is determined that the apparatus information including the alternative FAX number "yy-yyyy-yyyy" is registered in the FAX apparatus list (S83: Yes), like the example of FIG. 1, the terminal program 65 transmits the FAX transmission instruction information to the MFP 10C, which is identified with the alternative apparatus ID "MFP-C" included in the apparatus information, through the communication I/F 55 (S84), and executes the processing of S82 and thereafter. The processing of S84 is an example of the first alternative instruction processing.

On the other hand, when it is determined that the apparatus information including the alternative FAX number different from the FAX number "xx-xxxx-xxxx" is not registered in the FAX apparatus list (S83: No), the terminal program 65 displays an error screen (not shown) for notifying the line BUSY state on the display 53 (S85), and ends the FAX instruction processing.

Also, when it is determined that the result information "apparatus BUSY" has been received (S82: apparatus BUSY), the terminal program 65 determines whether the apparatus information, which includes the same alternative FAX number as the FAX number "xx-xxxx-xxx" of the FAX apparatus information and the alternative apparatus ID different from the apparatus ID "MFP-B" of the FAX apparatus information, is registered in the FAX apparatus list (S86). The processing of S86 is an example of the fourth determination processing. In the example of FIG. 1, in the FAX apparatus list, the apparatus information, which includes the same alternative FAX number as the FAX number "xx-xxxx-xxx" and the alternative apparatus ID different from the apparatus ID "MFP-B" of the FAX apparatus information, is not registered.

When it is determined that the apparatus information, which includes the alternative FAX number "xx-xxxx-xxxx" and the alternative apparatus ID "MFP-C", is registered in the FAX apparatus list (S86: Yes), the terminal program 65 transmits the FAX transmission instruction information to the MFP 10C, which is identified with the alternative apparatus ID "MFP-C" included in the apparatus information, through the communication I/F 55 (S87), and executes the processing of S82 and thereafter. The processing of S87 is an example of the second alternative instruction processing.

On the other hand, when it is determined that the apparatus information, which includes the same alternative FAX number as the FAX number "xx-xxxx-xxx" of the FAX apparatus information and the alternative apparatus ID different from the apparatus ID "MFP-B" of the FAX apparatus information, is not registered in the FAX apparatus list (S86: No), like the example of FIG. 1, the terminal program 65 displays an error screen (not shown) for notifying the apparatus BUSY state on the display 53 (S88), and ends the FAX instruction processing.

Returning to FIG. 3, when a designation of the operation icon 111 is received through the user I/F 54 (S15: Yes), the terminal program 65 executes print processing (S21). Although the print processing is not shown, the terminal program 65 receives a designation of designating, as the designated data, one of the plurality of data stored in the data folder of the memory 62, through the user I/F 54. Then, the terminal program 65 transmits the print instruction information for the designated data to the MFP 10A indicated by the designated apparatus information, through the communication I/F 55. The processing of the MFP 10A having received the print instruction information is common to the description of the processing of S68. The processing of S21 is an example of the second instruction processing, and the print instruction information is an example of the second instruction information.

Also, when a designation of the operation icon 112 is received through the user I/F 54 (S15: Yes), the terminal program 65 executes scan processing (S21). Although the scan processing is not shown, the terminal program 65 transmits the scan instruction information to the MFP 10A indicated by the designated apparatus information, through the communication I/F 55. Then, the terminal program 65 receives the scan data, as a response to the scan instruction information, from the MFP 10A through the communication I/F 55. The processing of the MFP 10A having received the scan instruction information is common to the description of the processing of S73 and S74. The processing of S21 is an example of the second instruction processing, and the scan instruction information is an example of the second instruction information.

[Technical Effects of Illustrative Embodiment]

According to the above illustrative embodiment, the MFP 10 conforming to the predetermined decision criteria is decided as the designated FAX apparatus, and the MFP 10 designated by the user is decided as the designated apparatus. That is, the user's burden on the decision of the designated FAX apparatus is reduced, and the MFP 10 convenient for the user can be decided as the designated apparatus. As a result, it is possible to appropriately decide the MFP 10 for executing each of the plurality of image forming operations by the simple user operation.

In the meantime, it is thought that while the user of the portable terminal 50 is aware through which FAX line (i.e., through which FAX number) the FAX operation is to be executed, the user is less aware which of the MFPs 10 is enabled to execute the FAX operation. Therefore, like the above illustrative embodiment, it is preferable to decide the designated FAX apparatus by the appropriate method, depending on the number of the MFPs 10 detected in S31 and whether the FAX lines are the same.

As an example, when the number of the MFPs 10 detected in S31 is one, the detected MFP 10 is preferably decided as the designated FAX apparatus. In the meantime, in S31, the MFP 10 having the FAX I/F 13 is not simply detected but the MFP 10 of which the FAX I/F 13 is connected with the FAX line is detected. Therefore, it is possible to decide, as the designated FAX apparatus, the MFP 10 that is ready to execute the FAX operation. The detection condition in S31 is not limited to the above example, and the MFP 10 having the FAX I/F 13 may be detected.

As another example, when the plurality of MFPs 10B, 10C detected in S13 is connected to the same FAX line, the terminal program 65 preferably automatically decides the designated FAX apparatus. Thereby, the user's operation of deciding the designated FAX apparatus is omitted. However, the specific example of the first decision criterion in S36 is not limited to the condition "the MFP 10 having the highest specification". As another example, the MFP 10 by which the FAX transmission operation has been most performed during a predetermined time period, the MFP 10 by which the second operation (i.e., the printing operation, the scanning operation) has been least performed during a predetermined time period, or the like may be decided as the designated FAX apparatus.

As another example, when the plurality of MFPs 10B, 10C detected in S13 is connected to the different FAX lines, the user preferably manually decides the designated FAX apparatus. Thereby, the user can execute the FAX operation by using the desired FAX number. However, the specific example of the second decision criterion in S39 is not limited to the condition "the user's selection through the user I/F 54". For example, when the two MFPs 10 connected to the first FAX line and the three MFPs 10 connected to the second FAX line are detected in S31, the designated FAX apparatus may be decided by a following sequence.

As an example, the terminal program 65 may narrow down the two MFPs 10 connected to the first FAX line to one in accordance with the first decision criterion, and narrow down the three MFPs 10 connected to the second FAX line to one in accordance with the first decision criterion. Then, the terminal program 65 may receive a designation of designating one of the narrowed MFPs 10, through the user I/F 54. Then, the terminal program 65 may decide the MFP 10 designated through the user I/F 54, as the designated FAX apparatus.

As another example, the terminal program 65 may receive a designation of designating one of the first FAX line and the second FAX line, through the user I/F 54. When the first FAX line is designated, for example, the terminal program 65 may decide one of the two MFPs 10 connected to the first FAX line, as the designated FAX apparatus, in accordance with the first decision criterion. Like this example, when the MFPs 10 connected to the different FAX lines are detected, the designated FAX apparatus is decided by combining the first decision criterion and the second decision criterion, so that the desired MFP 10 is decided as the designated FAX apparatus with the small operation burden.

In the meantime, the timing at which the FAX apparatus selection processing is executed is not limited to the timing of S17. As another example, the terminal program 65 may execute the FAX apparatus selection processing upon activation of the terminal program 65, or may execute the FAX apparatus selection processing immediately before displaying the main screen.

In the meantime, it is naturally thought that the user of the portable terminal 50 wants to decide, as the designated apparatus for executing the second operation, the MFP 10 convenient for the user, such as the MFP 10 equipped in the vicinity of a seat of the user, the MFP 10 equipped on a passage where the user frequently passes, or the like. Therefore, when the user is permitted to designate the designated apparatus through the user I/F 54, it is possible to enable the MFP 10 convenient for the user to execute the second operation. However, the interface (I/F) for designating the designated apparatus is not limited to the user I/F 54.

As another example, the MFP 10 and the portable terminal 50 may include a near-field communication I/F capable of executing performing near-field wireless communication. The near-field wireless communication indicates wireless communication of which a communication range is relatively short (for example, several centimeters to several meters), as compared to Wi-Fi. That is, the near-field communication I/F can perform wireless communication only with a partner apparatus that is present in the communication range of the near-field wireless communication. The specific example of the near-field wireless communication is not particularly limited. For example, NFC, TransferJet (Trademark), Bluetooth (Trademark) or the like may be adopted. The terminal program 65 may be configured to decide, as the designated apparatus, the MFP 10 that is present in the communication range of the near-field wireless communication by the near-field communication I/F. Thereby, the user of the portable terminal 50 can designate, as the designated apparatus, the desired MFP 10 simply by touching the portable terminal 50 to the corresponding MFP 10.

In the meantime, the timing at which the designated apparatus is decided by the above method is not limited to the timing of S18. As an example, the terminal program 65 may display a message "Please touch the portable terminal to the MFP that is to be enabled to execute the printing operation" on the display 53 immediately before S68, decide, as the designated apparatus, the MFP 10 that is present in the communication range of the near-field communication I/F, during the display of the message, and transmit the print instruction information to the decided designated apparatus. As another example, the terminal program 65 may further display the above message on the preparation instruction screen in S71, decide, as the designated apparatus, the MFP 10 that is present in the communication range of the near-field communication I/F, in S72, instead of tapping the [start] icon 160, and transmit the scan instruction information to the decided designated apparatus.

Also, according to the above illustrative embodiment, when the document is set on the designated apparatus convenient for the user, the designated apparatus can enable the designated FAX apparatus to execute the FAX transmission operation for the image data generated in the scanning operation. Thereby, it is not necessary for the user to move to the designated FAX apparatus so as to set the document thereon. Also, according to the above illustrative embodiment, the apparatus information of the FAX apparatus detected in S31 is registered in the FAX apparatus list, so that it is possible to enable the alternative apparatus to alternatively execute the FAX transmission operation, in correspondence to the cause of the abnormal termination of the FAX transmission operation.

Also, according to the above illustrative embodiment, it is possible to enable the designated apparatus convenient for the user to execute the printing operation for the FAX data FAX-received by the designated FAX apparatus. Thereby, it is not necessary for the user to move to the designated FAX apparatus so as to collect the sheet having the image recorded thereon. Also, the apparatus information of the FAX apparatus detected in S31 is registered in the FAX apparatus list, so that it is possible to enable the user to select the desired image data from all the FAX data FAX-transmitted to the same FAX line.

In the meantime, the terminal program 65 may receive only the data ID of the FAX data stored in the FAX apparatus, in S61 and S63. The terminal program 65 may receive the FAX data, which is identified with the data ID corresponding to the data icon designated in S65, from the FAX apparatus through the communication I/F 55.

Figure 7:
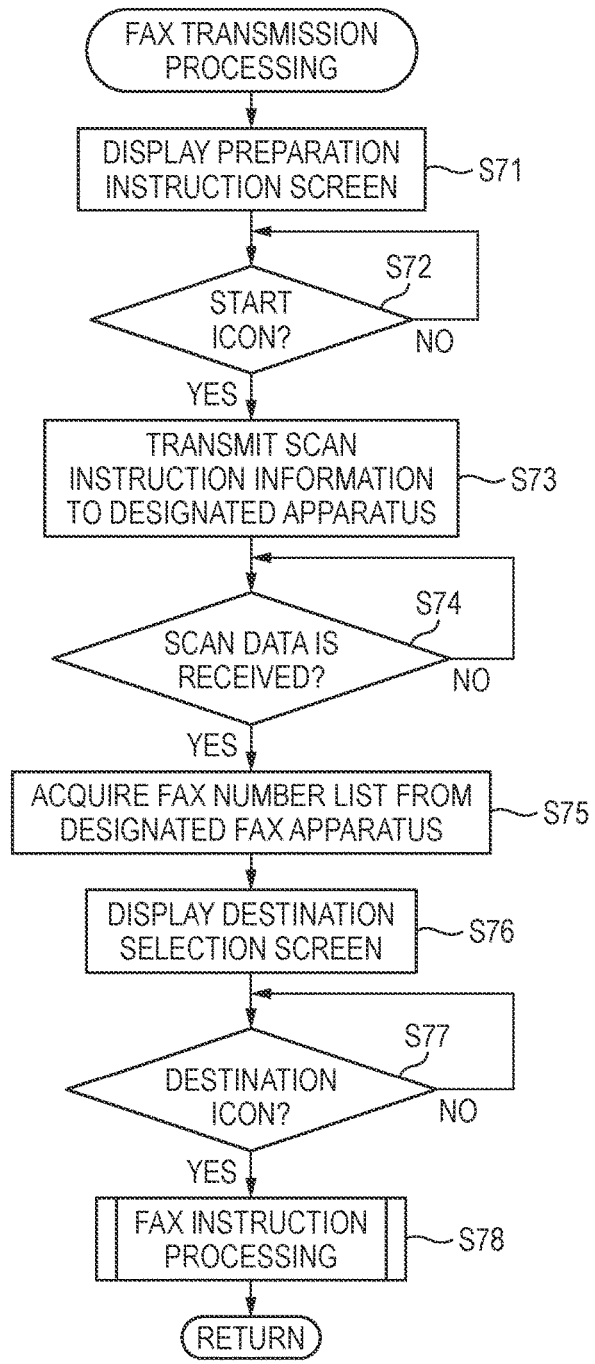
FIG. 7 is a flowchart of FAX transmission processing.
Figure 8:
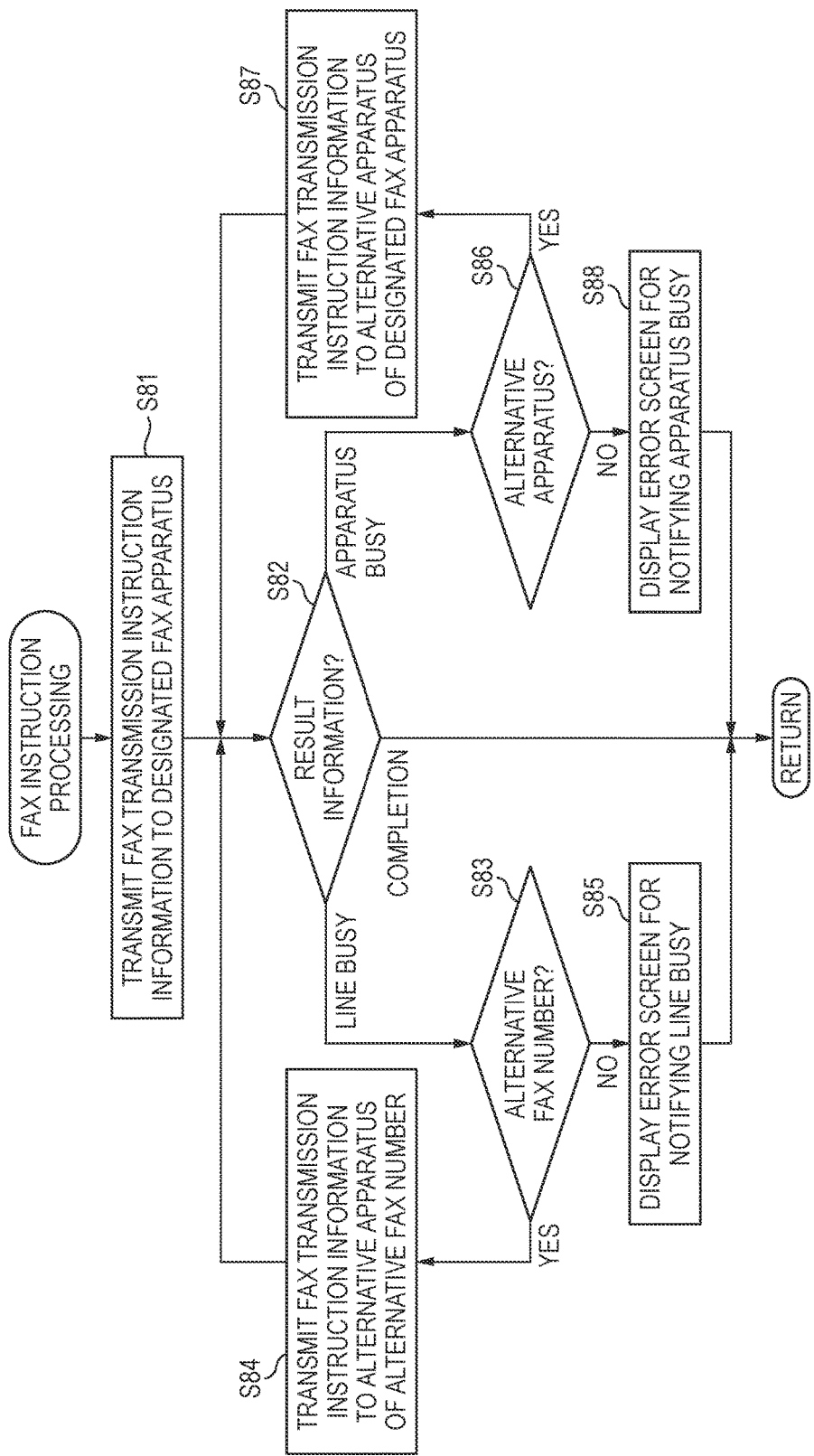
FIG. 8 is a flowchart of FAX instruction processing.

Also, the processing of S62 and S63 can be applied to the case where the FAX number list is acquired in S75 of FIG. 7. That is, the terminal program 65 may further receive the FAX number list from the alternative apparatus connected to the same FAX line as the designated FAX apparatus, through the communication I/F 55. The terminal program 65 may enable the user to designate the desired FAX number from the FAX numbers received from the designated FAX apparatus and the alternative apparatus.

Figure 6:
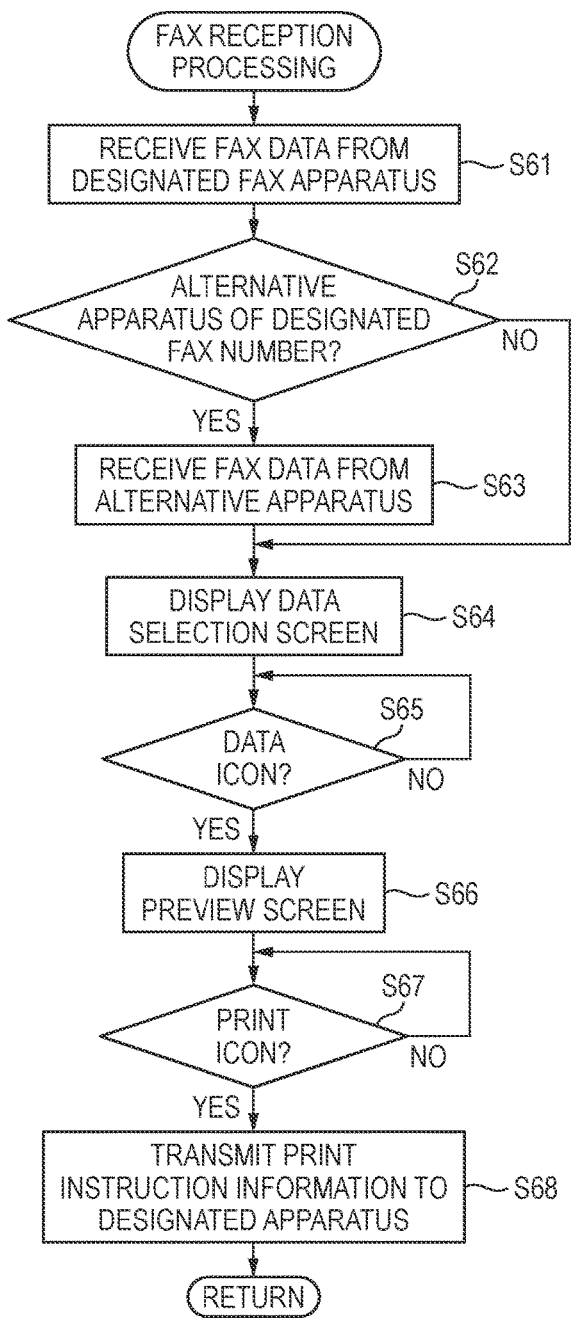
FIG. 6 is a flowchart of FAX reception processing.

Also, the processing of FIG. 6 is not limited to the printing operation for the FAX data received by the FAX reception operation. As another example, the terminal program 65 may receive the result information stored in the designated FAX apparatus in S61 and S63 of FIG. 6, and enable the designated apparatus to execute the printing operation for the result information designated in S65. The processing of receiving the result information is an example of the fourth receiving processing. That is, the processing of FIG. 6 can be applied to the processing of outputting a communication management report of the designated FAX apparatus to the designated apparatus, too.

Also, according to the above illustrative embodiment, since the switching icon 115 is described thereon with the apparatus ID of the designated apparatus, it is possible to enable the user to recognize which of the MFPs 10 is designated as the designated apparatus. Also, it is possible to enable the user to recognize whether the designated FAX apparatus and the designated apparatus are the same by the display aspect of the operation icons 113, 114. Also, the terminal program 65 may display the operation icons 113, 114 on the main screen when the FAX apparatus information is stored in the memory 62 (i.e., when the designated FAX apparatus has been already decided), and may not display the operation icons 113, 114 on the main screen when the FAX apparatus information is not stored in the memory 62 (i.e., when the designated FAX apparatus has not been decided yet). Thereby, it is possible to enable the user to recognize whether the designated FAX apparatus has been decided.

Also, in the MFP 10 and the portable terminal 50 of the above illustrative embodiment, the diverse programs stored in the memories 32, 62 are executed by the CPUs 31, 61, so that the respective processing to be executed by the controller of the present disclosure is implemented. However, the configuration of the controller is not limited thereto and some or all of the controller may be implemented by the hardware such as an integrated circuit and the like.

Also, the present disclosure can be implemented as not only the MFP 10 and the portable terminal 50 but also a program configured to enable the MFP 10 and the portable terminal 50 to execute the processing. The program may be provided with being recorded in a non-transitory recording medium. The non-transitory recording medium may include a memory mounted on a server that can be connected to the MFP 10 and the portable terminal 50 through the communication network 101, in addition to a CD-ROM, a DVD-ROM and the like. The program stored in the memory of the server may be transmitted through the communication network 101 such as the Internet, as information or signal indicative of the program.

What is claimed is:

1. A non-transitory computer-readable medium having a program stored thereon and readably by a computer of a portable terminal comprising a communication interface and a user interface, the program, when executed by the computer, causes the portable terminal to perform:
deciding an image forming apparatus, that is capable to execute a first operation, to be a first designated apparatus for executing the first operation out of a plurality of image forming apparatuses capable of performing communication through the communication interface in accordance with predetermined decision criteria;
deciding an image forming apparatus, that is designated by a user of the portable terminal, to be a second designated apparatus for executing a second operation different from the first operation out of the plurality of image forming apparatuses capable of performing communication through the communication interface;
receiving an operation designation of designating at least one of the first operation and the second operation, through the user interface;
transmitting first instruction information that instructs to execute the first operation, to the first designated apparatus through the communication interface, when the first operation is designated in the operation designation, and transmitting second instruction information that instructs to execute the second operation, to the second designated apparatus through the communication interface, when the second operation is designated in the operation designation.

2. The non-transitory computer-readable medium according to claim 1,
wherein the program further causes the portable terminal to perform displaying, on a display of the portable terminal, a first object, a second object, and a switching object on that a character string indicating the second designated apparatus is described, in response to the deciding of the first designated apparatus and the deciding of the second designated apparatus, prior to the receiving of the operation designation, and
wherein the program causes the portable terminal to perform:
the transmitting of the first instruction information when the first object is designated in the operation designation,
the transmitting of the second instruction information when the second object is designated in the operation designation, and
the deciding of the second designated apparatus when the switching object is designated in the operation designation.

3. The non-transitory computer-readable medium according to claim 2,
wherein the program causes the portable terminal to perform in the displaying:
displaying the first object and the second object in a common display aspect when the first designated apparatus and the second designated apparatus are the same, and
displaying the first object and the second object in each different display aspect when the first designated apparatus and the second designated apparatus are different from each other.

4. The non-transitory computer-readable medium according to claim 2,
wherein the program causes the portable terminal to perform, in the displaying, displaying the first object on the display in a case where the first designated apparatus is already decided in the deciding of the first designated apparatus, and
wherein the program causes the portable terminal not to perform, in the displaying, displaying the first object on the display in a case where the first designated apparatus is not decided in the deciding of the first designated apparatus.

5. The non-transitory computer-readable medium according to claim 1,
wherein the first operation is an image processing, in that neither physical input nor output of an image to be processed in the first designated apparatus is required, and
the second operation is an image processing, in that at least one of physical input and output of an image to be processed in the second designated apparatus is required.

6. The non-transitory computer-readable medium according to claim 5,
wherein the program further causes the portable terminal to perform when the first operation including transmission of image data to an external apparatus is designated in the operation designation:
transmitting generation instruction information that instructs to execute the second operation of generating the image data indicating a physically input image, to the second designated apparatus through the communication interface;
receiving the image data generated by the second operation in the second designated apparatus in accordance with the generation instruction information, as a response to the generation instruction information, from the second designated apparatus through the communication interface; and
the transmitting of the first instruction information that instructs to execute the first operation of transmitting the image data received in the receiving of the image data to the external apparatus, to the first designated apparatus through the communication interface.

7. The non-transitory computer-readable medium according to claim 5,
wherein the program further causes the portable terminal to perform when the first operation, including reception of image data from an external apparatus is designated in the operation designation:
the transmitting of the first instruction information that instructs to execute the first operation of transmitting the image data received from the external apparatus, to the first designated apparatus through the communication interface;
receiving the image data, as a response to the first instruction information, from the first designated apparatus through the communication interface;
receiving an image data designation of designating one of the image data received from the first designated apparatus, through the user interface; and
transmitting output instruction information that instructs to execute the second operation of physically outputting an image indicated by the image data designated in the image data designation, to the second designated apparatus through the communication interface.

8. The non-transitory computer-readable medium according to claim 5,
wherein the first operation is a FAX transmission operation of FAX-transmitting image data to an external apparatus through a FAX line connected to the image forming apparatus or a FAX reception operation of FAX-receiving the image data from the external apparatus through the FAX line, and
wherein the program further causes the portable terminal to perform:
detecting an image forming apparatus connected to the FAX line out of the plurality of image forming apparatuses capable of performing communication through the communication interface; and
deciding one of the image forming apparatuses detected in the detecting of the image forming apparatus connected to the FAX line, to be the first designated apparatus.

9. The non-transitory computer-readable medium according to claim 8,
wherein the program causes the portable terminal to perform, when only one image forming apparatus is detected in the detecting of the image forming apparatus connected to the FAX line, deciding the detected image forming apparatus to be the first designated apparatus in the deciding of the first designated apparatus.

10. The non-transitory computer-readable medium according to claim 8,
wherein the program causes the portable terminal to perform when plural image forming apparatuses are detected in the detecting of the image forming apparatus connected to the FAX line:
determining whether the FAX lines connected to each of the plural image forming apparatuses detected are the same or not;
deciding the first designated apparatus in accordance with a first decision criterion that is one of the decision criteria when it is determined that the FAX lines are the same; and
deciding the first designated apparatus in accordance with a second decision criterion that is one of the decision criteria when it is determined that the FAX lines are different.

11. The non-transitory computer-readable medium according to claim 10,
wherein the program causes the portable terminal to perform, when it is determined that the FAX lines are the same, deciding an image forming apparatus that conforms to a predetermined condition to be the first designated apparatus, out of the plural image forming apparatuses detected in the detecting of the image forming apparatus connected to the FAX line.

12. The non-transitory computer-readable medium according to claim 10,
wherein the program causes the portable terminal to perform, when it is determined that the FAX lines are different, deciding an image forming apparatus that is designated through the user interface to be the first designated apparatus, out of the plural image forming apparatuses detected in the detecting of the image forming apparatus connected to the FAX line.

13. The non-transitory computer-readable medium according to claim 8,
wherein the second operation is a scanning operation of reading an image recorded on a document to generate the image data, and
wherein the program causes the portable terminal to perform when the FAX transmission operation is designated in the operation designation:
transmitting scan instruction information that instructs to execute the scanning operation to the second designated apparatus through the communication interface;
receiving the image data generated by the scanning operation in the second designated apparatus in accordance with the scan instruction information, as a response to the scan instruction information, from the second designated apparatus through the communication interface; and
the transmitting of the first instruction information that is FAX transmission instruction information that instructs to execute the FAX transmission operation of the image data received from the second designated apparatus, to the first designated apparatus through the communication interface.

14. The non-transitory computer-readable medium according to claim 13,
wherein the program causes the portable terminal to perform, when the plural image forming apparatuses are detected in the detecting of the image forming apparatus connected to the FAX line, storing the first designated apparatus in association with an alternative apparatus ID and an alternative line ID in a memory of the portable terminal, the alternative apparatus ID being to identify an alternative apparatus different from the first designated apparatus out of the plural image forming apparatuses, and the alternative line ID being to identify a FAX line connected to the alternative apparatus, and
wherein the program causes the portable terminal to perform:
determining whether the FAX transmission operation instructed in the first designated apparatus is normally terminated;
determining whether the alternative line ID of the FAX line different from the FAX line connected to the first designated apparatus is stored in the memory when it is determined that the FAX transmission operation is abnormally terminated because the FAX line connected to the first designated apparatus is in use; and
transmitting the first instruction information to the alternative apparatus identified with the alternative apparatus ID associated with the alternative line ID, through the communication interface, when it is determined that the alternative line ID is stored in the memory.

15. The non-transitory computer-readable medium according to claim 13,
wherein the program causes the portable terminal to perform, when the plural image forming apparatuses are detected in the detecting of the image forming apparatus connected to the FAX line, storing the first designated apparatus in association with an alternative apparatus ID and an alternative line ID in a memory of the portable terminal, the alternative apparatus ID being to identify an alternative apparatus different from the first designated apparatus out of the plural image forming apparatuses, and the alternative line ID being to identify a FAX line connected to the alternative apparatus, and
wherein the program causes the portable terminal to perform:
determining whether the FAX transmission operation instructed in the first designated apparatus is normally terminated;
determining whether the alternative line ID of the FAX line, that is the same as the FAX line connected to the first designated apparatus, is stored in the memory when it is determined that the FAX transmission operation is abnormally terminated because the first designated apparatus is operating; and
transmitting the first instruction information to the alternative apparatus identified with the alternative apparatus ID associated with the alternative line ID, through the communication interface, when it is determined that the alternative line ID is stored in the memory.

16. The non-transitory computer-readable medium according to claim 8,
wherein the second operation is a printing operation of recording an image indicated by the image data on a sheet, and
wherein the program causes the portable terminal to perform when the FAX reception operation is designated in the operation designation:
transmitting, as the first instruction information, transmission instruction information that instructs to transmit the image data that the first designated apparatus FAX-receives in the FAX reception operation, to the first designated apparatus through the communication interface;

receiving the image data, as a response to the transmission instruction information, from the first designated apparatus through the communication interface;

receiving an image data designation of designating one of the image data received from the first designated apparatus, through the user interface; and transmitting print instruction information that instructs to execute the printing operation for the image data designated in the image data designation, to the second designated apparatus through the communication interface.

17. The non-transitory computer-readable medium according to claim 16, wherein the program causes the portable terminal to perform, when the plural image forming apparatuses are detected in the detecting of the image forming apparatus connected to the FAX line, storing the first designated apparatus in association with an alternative apparatus ID and an alternative line ID in a memory of the portable terminal, the alternative apparatus ID being to identify an alternative apparatus different from the first designated apparatus out of the plural image forming apparatuses, and the alternative line ID being to identify a FAX line connected to the alternative apparatus, and wherein the program causes the portable terminal to perform when the FAX reception is designated in the operation designation:

determining whether the alternative line ID of the FAX line, that is the same as the FAX line connected to the first designated apparatus, is stored in the memory;

receiving the image data, that is FAX-received by the alternative apparatus identified with the alternative apparatus ID associated with the alternative line ID, from the alternative apparatus through the communication interface, when it is determined that the alternative line ID is stored in the memory; and the receiving of the image data designation of designating one of the image data received from the first designated apparatus and the alternative apparatus, through the user interface.

18. The non-transitory computer-readable medium according to claim 8, wherein the second operation is a printing operation of recording an image indicated by the image data on a sheet, and wherein the program causes the portable terminal to perform when a transmission operation of transmitting result information indicating a result of the FAX transmission operation is designated in the operation designation:

transmitting, as the first instruction information, transmission instruction information that instructs to transmit the result information to the first designated apparatus through the communication interface;

receiving the result information as a response to the transmission instruction information from the first designated apparatus through the communication interface; and transmitting print instruction information that instructs the printing operation for the result information received from the first designated apparatus, to the second designated apparatus through the communication interface.

19. The non-transitory computer-readable medium according to claim 1, wherein the program causes the portable terminal to perform detecting an image forming apparatus that is capable to execute the second operation out of the plurality of image forming apparatuses capable of performing communication through the communication interface, wherein, the program causes the portable terminal to perform when the image forming apparatus that is capable to execute the second operation is detected:

receiving an apparatus designation of designating one of the detected image forming apparatuses, through the user interface; and the deciding of the second designated apparatus to be the image forming apparatus designated in the apparatus designation, and wherein, the program causes the portable terminal to perform when the image forming apparatus that is capable to execute the second operation is not detected:

determining whether the first designated apparatus is already decided; and deciding the first designated apparatus to be the second designated apparatus when it is determined that the first designated apparatus is already decided.

20. The non-transitory computer-readable medium according to claim 1, wherein the program causes the portable terminal to perform the deciding of the second designated apparatus to be an image forming apparatus that is present in a range of near-field wireless communication by a near-field communication interface of the portable terminal.

21. The non-transitory computer-readable medium according to claim 1, wherein the program further causes the portable terminal to perform:

obtaining apparatus information for identifying an image processing operation that can be executed by the image forming apparatus, from the image forming apparatus; and deciding an image forming apparatus, that is capable to execute the first operation, to be the first designated apparatus based on the obtained apparatus information.

22. A portable terminal comprising:

a communication interface;

a user interface, and a controller, wherein the controller is executable with instructions which, when executed, cause the controller to perform:

deciding an image forming apparatus, that is capable to execute a first operation, to be a first designated apparatus for executing the first operation out of a plurality of image forming apparatuses capable of performing communication through the communication interface in accordance with predetermined decision criteria;

deciding an image forming apparatus, that is designated by a user of the portable terminal, to be a second designated apparatus for executing a second operation different from the first operation out of the plurality of image forming apparatuses capable of performing communication through the communication interface;

receiving an operation designation of designating at least one of the first operation and the second operation, through the user interface;

transmitting first instruction information that instructs to execute the first operation, to the first designated apparatus through the communication interface, when the first operation is designated in the operation designation; and transmitting second instruction information that instructs to execute the second operation, to the second designated apparatus through the communication interface, when the second operation is designated in the operation designation.

23. The portable terminal according to claim 22, wherein the controller is further executable with instructions which causes the controller to perform:

obtaining apparatus information for identifying an image processing operation that can be executed by the image forming apparatus, from the image forming apparatus; and deciding an image forming apparatus, that is capable to execute the first operation, to be the first designated apparatus based on the obtained apparatus information.

\* \* \* \* \*